United States Patent
Yamashita

(10) Patent No.: US 10,527,921 B2
(45) Date of Patent: Jan. 7, 2020

(54) TRANSPARENT SCREEN, PROJECTION SYSTEM, AND METHOD OF CONTROLLING TRANSPARENT SCREEN

(71) Applicant: Panasonic Intellectual Property Management Co., Ltd., Osaka (JP)

(72) Inventor: Takehiko Yamashita, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/137,070

(22) Filed: Sep. 20, 2018

(65) Prior Publication Data

US 2019/0025692 A1  Jan. 24, 2019

Related U.S. Application Data

(63) Continuation of application No. PCT/JP2016/004739, filed on Oct. 28, 2016.

(30) Foreign Application Priority Data

Mar. 24, 2016  (JP) .................. 2016-060763

(51) Int. Cl.
  *G03B 21/62* (2014.01)
  *G03B 21/58* (2014.01)
  (Continued)

(52) U.S. Cl.
  CPC .............. *G03B 21/62* (2013.01); *G02B 5/02* (2013.01); *G02F 1/1347* (2013.01); *G03B 21/56* (2013.01);
  (Continued)

(58) Field of Classification Search
  CPC ...................................... G03B 21/58

USPC ........................................................ 359/461
See application file for complete search history.

(56) References Cited

U.S. PATENT DOCUMENTS

| | | | | |
|---|---|---|---|---|
| 5,075,789 A | * | 12/1991 | Jones ..................... | G09G 3/002 348/E5.131 |
| 5,175,637 A | * | 12/1992 | Jones ..................... | G09G 3/002 348/E5.131 |

(Continued)

FOREIGN PATENT DOCUMENTS

| | | | | |
|---|---|---|---|---|
| JP | 2004-233692 | | 8/2004 | |
| JP | 2004233692 | * | 8/2004 | ............ G03B 21/00 |

(Continued)

OTHER PUBLICATIONS

International Search Report (ISR) dated Jan. 17, 2017 in International (PCT) Application No. PCT/JP2016/004739.

*Primary Examiner* — Clayton E. LaBalle
*Assistant Examiner* — Kevin C Butler
(74) *Attorney, Agent, or Firm* — Wenderoth, Lind & Ponack, L.L.P.

(57) ABSTRACT

A transparent screen which displays an image projected from a projector. The transparent screen includes a display panel including a diffusion film which diffuses projection light from the projector, and a tinted film which is disposed to be remoter from the projector than the diffusion film is and has a transmittance which is variable. The transparent screen includes a controller which performs control to decrease the transmittance of the tinted film when an illuminance of a site where the transparent screen is installed is equal to or higher than a first threshold, and performs control to increase the transmittance of the tinted film when the illuminance is equal to or lower than a second threshold lower than the first threshold.

12 Claims, 14 Drawing Sheets

(51) Int. Cl.
  *H04M 1/02* (2006.01)
  *G03B 21/60* (2014.01)
  *G03B 21/56* (2006.01)
  *G06F 1/16* (2006.01)
  *G02F 1/1347* (2006.01)
  *H04N 5/74* (2006.01)
  *G02B 5/02* (2006.01)
  *G02F 1/1334* (2006.01)

(52) U.S. Cl.
  CPC ............ *G03B 21/58* (2013.01); *G03B 21/60* (2013.01); *G06F 1/1601* (2013.01); *H04M 1/0268* (2013.01); *H04N 5/74* (2013.01); *G02F 1/1334* (2013.01)

(56) References Cited

U.S. PATENT DOCUMENTS

| | | | |
|---|---|---|---|
| 5,193,015 A * | 3/1993 | Shanks | G02B 5/3016 348/E9.025 |
| 5,416,617 A * | 5/1995 | Loiseaux | E06B 9/24 349/1 |
| 7,614,750 B2 * | 11/2009 | May | G03B 21/56 353/29 |
| 7,724,431 B2 * | 5/2010 | Field | G03B 21/56 359/443 |
| 2015/0362728 A1 * | 12/2015 | Tei | G02B 5/3033 353/20 |
| 2017/0160621 A1 * | 6/2017 | Yamashita | G03B 21/62 |

FOREIGN PATENT DOCUMENTS

| | | | | |
|---|---|---|---|---|
| JP | 2008-139643 | | 6/2008 | |
| JP | 200813964 | * | 6/2008 | ............ G02F 1/13 |
| JP | 2012-220540 | | 11/2012 | |
| JP | 2013-24959 | | 2/2013 | |
| JP | 2013024959 | * | 2/2013 | ............ G03B 21/10 |
| WO | 2014/112412 | | 7/2014 | |
| WO | 2016/035227 | | 3/2016 | |
| WO | WO-2016035227 A1 | * | 3/2016 | ............ G03B 21/62 |

* cited by examiner

|  | ILLUMINANCE OF EXTERNAL LIGHT (lx) | | | |
|---|---|---|---|---|
|  | 100 | 300 | 500 | 1000 |
| LUMINANCE OF PROJECTION LIGHT FROM PROJECTOR (lm) | 1500 | 4000 | 5000 | 7000 |
| TRANSMITTANCE OF DISPLAY PANEL (%) | 65 | 50 | 35 | 28 |
| (1) OVERALL WHITE LUMINANCE (cd/m$^2$) | 950 | 1200 | 1332 | 1750 |
| (2) OVERALL BLACK LUMINANCE (cd/m$^2$) | 6 | 8 | 9 | 12 |
| CONTRAST ((2)/(1)) | 158:1 | 150:1 | 148:1 | 146:1 | ial
TRANSPARENT SCREEN, PROJECTION SYSTEM, AND METHOD OF CONTROLLING TRANSPARENT SCREEN

CROSS REFERENCE TO RELATED APPLICATIONS

This application is a U.S. continuation application of PCT International Patent Application Number PCT/JP2016/004739 filed on Oct. 28, 2016, claiming the benefit of priority of Japanese Patent Application Number 2016-060763 filed on Mar. 24, 2016, the entire contents of which are hereby incorporated by reference.

BACKGROUND

1. Technical Field

The present disclosure relates to transparent screens which display images projected from projectors, projection systems including transparent screens, and methods of controlling transparent screens.

2. Description of the Related Art

Japanese Unexamined Patent Application Publication No. 2012-220540 discloses an apparatus which projects an image from a projector in an intermediate state between a light transmissive state and a light diffusive state, and displays the image on a surface opposite to an irradiated surface. Thereby, a transparent screen can display the projected image while maintaining high transmittance.

SUMMARY

The present disclosure provides a transparent screen, a projection system, and a method of controlling a transparent screen which are effective in providing images with high contrast even when the display surface of the transparent screen receives external light.

One aspect of the transparent screen according to the present disclosure is a transparent screen for displaying an image projected from a projector. The transparent screen includes a display panel including a diffusion film which diffuses projection light from the projector, and a tinted film is disposed to be remoter from the projector than the diffusion film is and has a transmittance which is variable. The transparent screen includes a controller which performs control to decrease the transmittance of the tinted film when an illuminance of the site where the transparent screen is installed is equal to or higher than a first threshold, and performs control to increase the transmittance of the tinted film when the illuminance is equal to or lower than a second threshold lower than the first threshold. The diffusion film is bonded to the tinted film.

A projection system according to one aspect of the present disclosure includes a projector, and the transparent screen which displays an image projected from the projector.

A method of controlling a transparent screen according to one aspect of the present disclosure is a method of controlling a transparent screen which displays an image projected from a projector. The transparent screen includes a diffusion film which diffuses projection light from the projector; and a tinted film which is disposed to be remoter from the projector than the diffusion film is and has a transmittance which is variable. The method involves performing control to decrease the transmittance of the tinted film when an illuminance of a site where the tinted film is located is equal to or higher than a first threshold, and to increase the transmittance of the tinted film when the illuminance is equal to or higher than a second threshold lower than the first threshold.

The transparent screen, the projection system, and the method of controlling a transparent screen according to the present disclosure are effective in providing high contrast images even when the display surface of the transparent screen receives external light.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
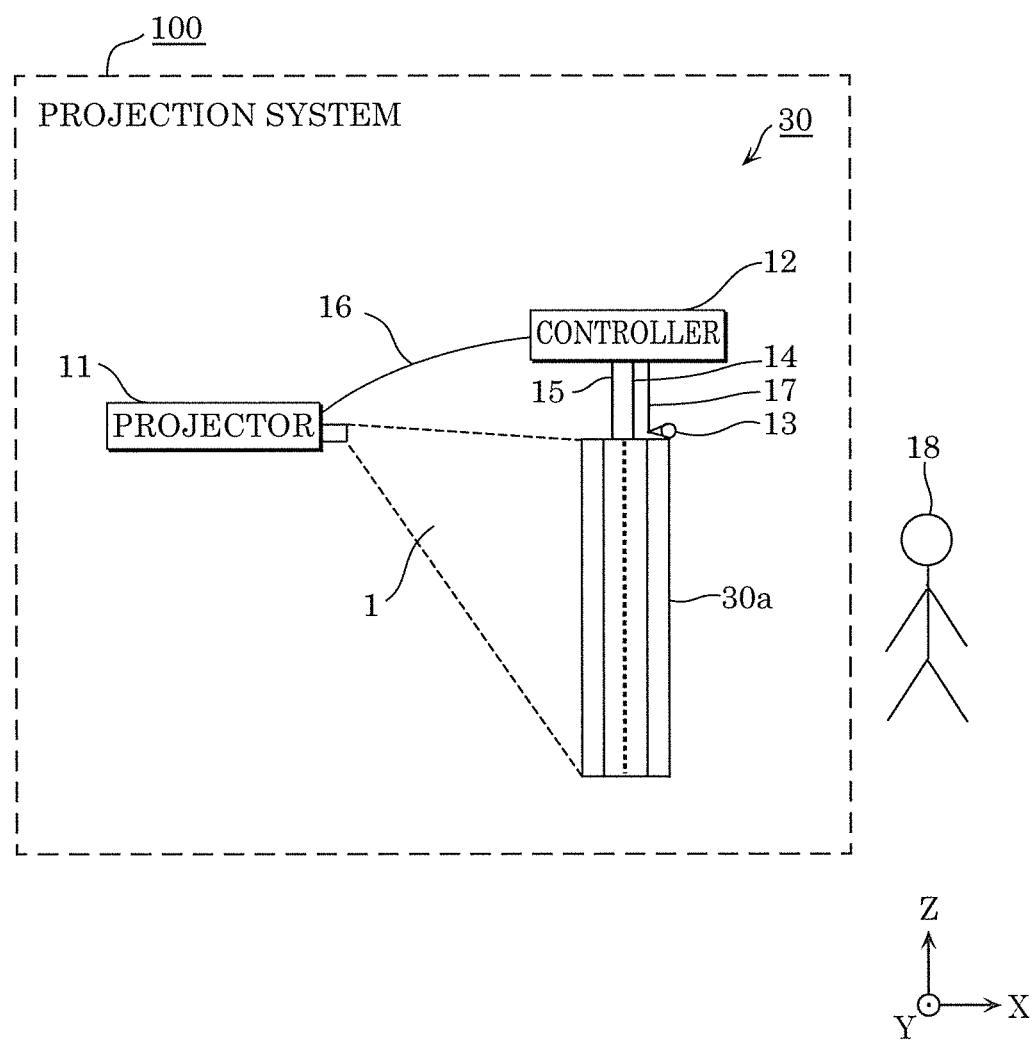
FIG. 1 is a diagram illustrating a configuration of a projection system according to Embodiment 1.

Embodiments will now be described in detail appropriately with reference to the drawings. Detailed description beyond necessity may be omitted in some cases. For example, detailed description of things already well-known or the duplication of description of substantially identical configurations will be omitted in some cases. This is for the purposes of avoiding unnecessary redundancy of the description below, and facilitating the understanding by persons skilled in the art.

The present inventors provide the accompanying drawings and the description below for sufficient understanding of the present disclosure by persons skilled in the art, and the accompanying drawings and the description below are not intended to be limitative to the subject matter in the scope of Claims. The accompanying drawings are schematic views, and are not always strictly drawn. In the accompanying drawings, identical reference numerals are given to substantially identical configurations, and the duplication of description of substantially identical configurations will be omitted or briefly mentioned in some cases. In the drawings, a Z-axis is a vertical axis parallel to the display surface (viewed surface) of a display panel, for example. An X-axis and a Y-axis are orthogonal to each other, and both are orthogonal to the Z-axis direction. The Y-axis is an axis of the display panel in the thickness direction.

Embodiment 1

Embodiment 1 will now be described with reference to FIGS. 1 to 6.

[1-1. Configuration]

[1-1-1. Configuration of Projection System]

FIG. 1 is a diagram illustrating a configuration of projection system 100 according to Embodiment 1.

In FIG. 1, projection system 100 includes projector 11 and transparent screen 30. Transparent screen 30 includes display panel 30a, controller 12, illuminance sensor 13, and control lines. Viewer 18 views an image in display panel 30a from an opposite side to projector 11 (hereinafter, the surface of display panel 30a viewed by viewer 18 is referred to as viewed surface).

Projector 11 projects a target image toward display panel 30a. In the example illustrated in FIG. 1, projector 11 is disposed at a position corresponding to an upper portion of display panel 30a; however, projector 11 may be disposed at any position. Projector 11 may be disposed at any position enabling viewer 18 to view images on display panel 30a. The resolution of the image projected on display panel 30a depends on the resolution of projector 11. For this reason, the resolution of the image to be projected can be enhanced by use of projector 11 with high resolution.

Figure 2:
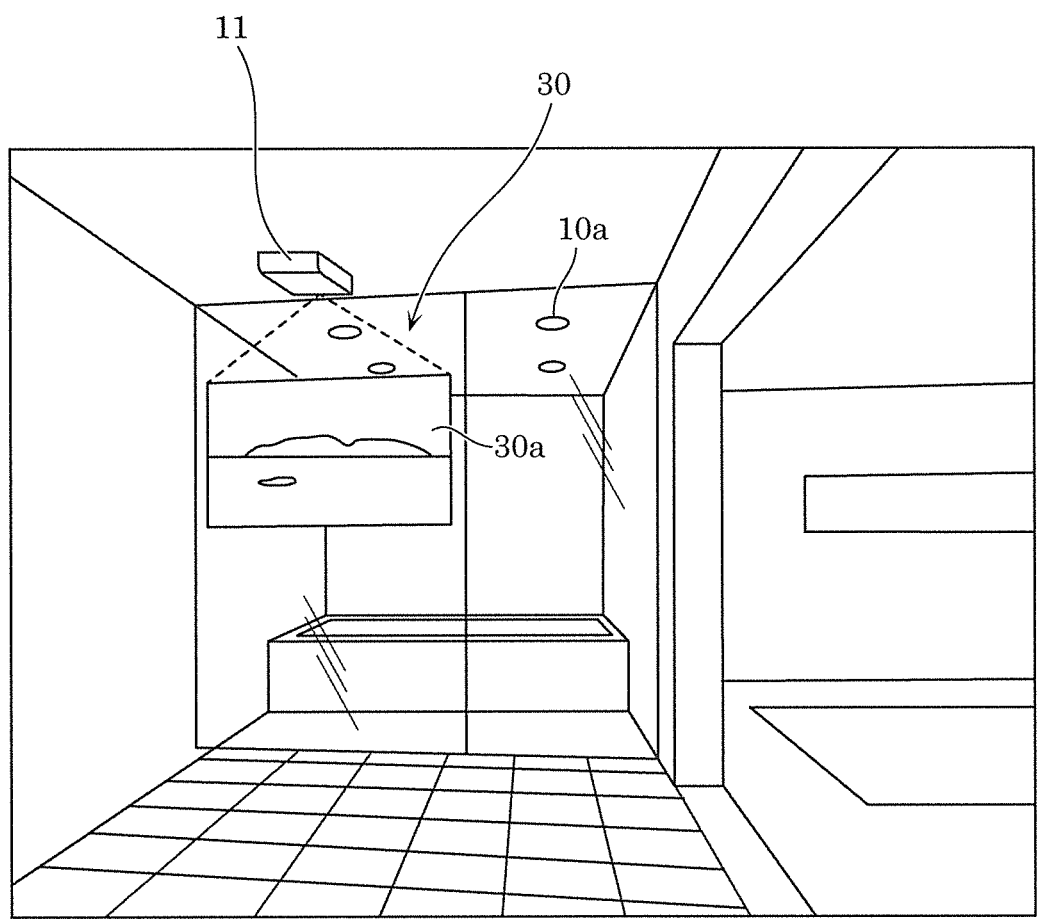
FIG. 2 is a diagram illustrating an example of installation of the projection system.

FIG. 2 is a diagram illustrating an example of installation of the projection system, in which transparent screen 30 is installed as a glass partition for separating a bathroom from a room. Projector 11 projects an image from the room toward the bathroom, and viewer 18 views the image displayed on display panel 30a from the bathroom. The bathroom has bathroom lighting 10a. Because of tinted film 6 described later, transparent screen 30 provides high contrast images even in such an environment where transparent screen 30 is illuminated by bathroom lighting 10a. It should be noted that the projection system is generally applicable to sites where glass is used. For this reason, the projection system may be used in store windows or vending machines. In addition, the projection system can also be used when images are displayed on floors or ceilings.

[1-1-2. Configuration of Display Panel 30a]

Figure 3:
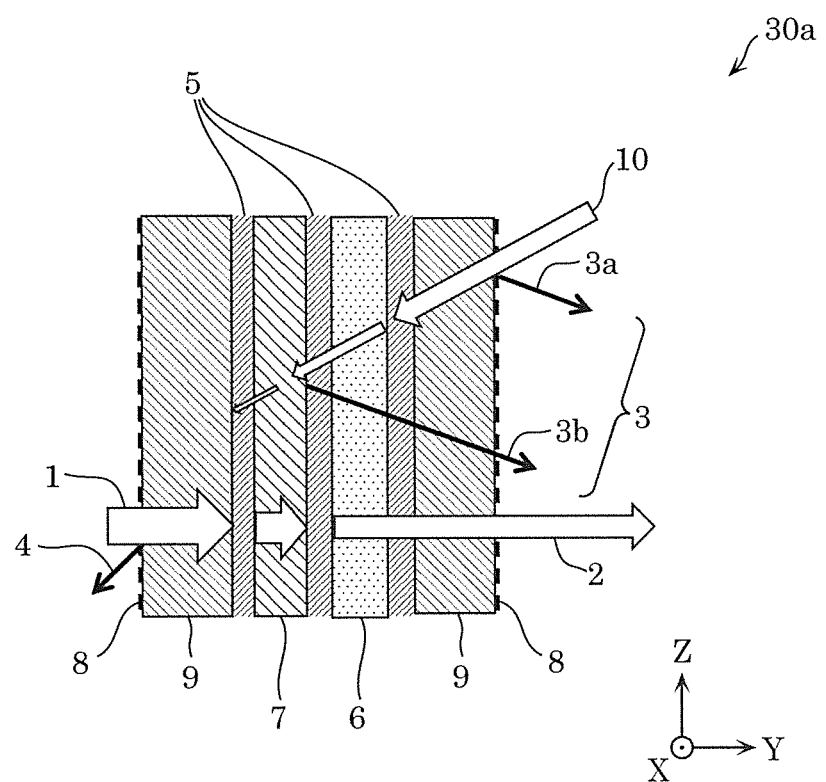
FIG. 3 is a sectional view illustrating a configuration of a display panel according to Embodiment 1.

FIG. 3 is a diagram illustrating a specific configuration of a cross-section (face parallel to the YZ plane) of display panel 30a in FIG. 1 cut orthogonal to the viewed surface of display panel 30a. External light 10 illustrated in FIG. 3 indicates light which enters display panel 30a from projector 11, other than projection light 1. For example, external light 10 is the sunlight or light from illumination.

In FIG. 3, display panel 30a includes intermediate film 5, tinted film 6, diffusion film 7, antireflective AR film 8, and two pieces of glass 9.

Intermediate film 5 bonds glass 9 to tinted film 6, tinted film 6 to diffusion film 7, and diffusion film 7 to glass 9, respectively. In other words, display panel 30a includes a film composed of tinted film 6 integrated with diffusion film 7 through intermediate film 5, and the integrated film is sandwiched between the two pieces of glass 9 with intermediate film 5 interposed therebetween. Intermediate film 5 is an adhesive sheet or resin having high transparency, for example. Bonding of glass 9 to tinted film 6, bonding of tinted film 6 to diffusion film 7, and bonding of diffusion film 7 to glass 9 may be achieved with intermediate film 5 made of the same material, or may be achieved with intermediate films 5 formed of different materials according to the materials of the substrates.

Tinted film 6 is convertible between a transparent state and a state where the transmittance is decreased (hereinafter, referred to as decreased transmittance state) in response to an external stimulus. The term "transmittance is decreased" indicates that light is absorbed by tinted film 6. The external stimulus indicates application of voltage, for example. In Embodiment 1, tinted film 6 includes tinted liquid crystal molecule 45 which can change between the transparent state and the decreased transmittance state by application of voltage and has low light diffusing function. The term "low light diffusing function" indicates that the degree of light diffusion is lower than that of diffusion film 7 or substantially equal to that of diffusion film 7 in a non-diffusion state described later. The transparent state indicates that light transmits through tinted film 6 because tinted liquid crystal molecule 45 in tinted film 6 barely absorbs light, in other words, tinted film 6 is in the state of high light transmittance. The decreased transmittance state indicates that light barely transmits through tinted film 6 because tinted liquid crystal molecule 45 in tinted film 6 absorbs light, in other words, tinted film 6 is in the state of low light transmittance. The degree of decreased transmittance of tinted film 6 can be controlled through variation of the voltage to be applied.

Figure 4:
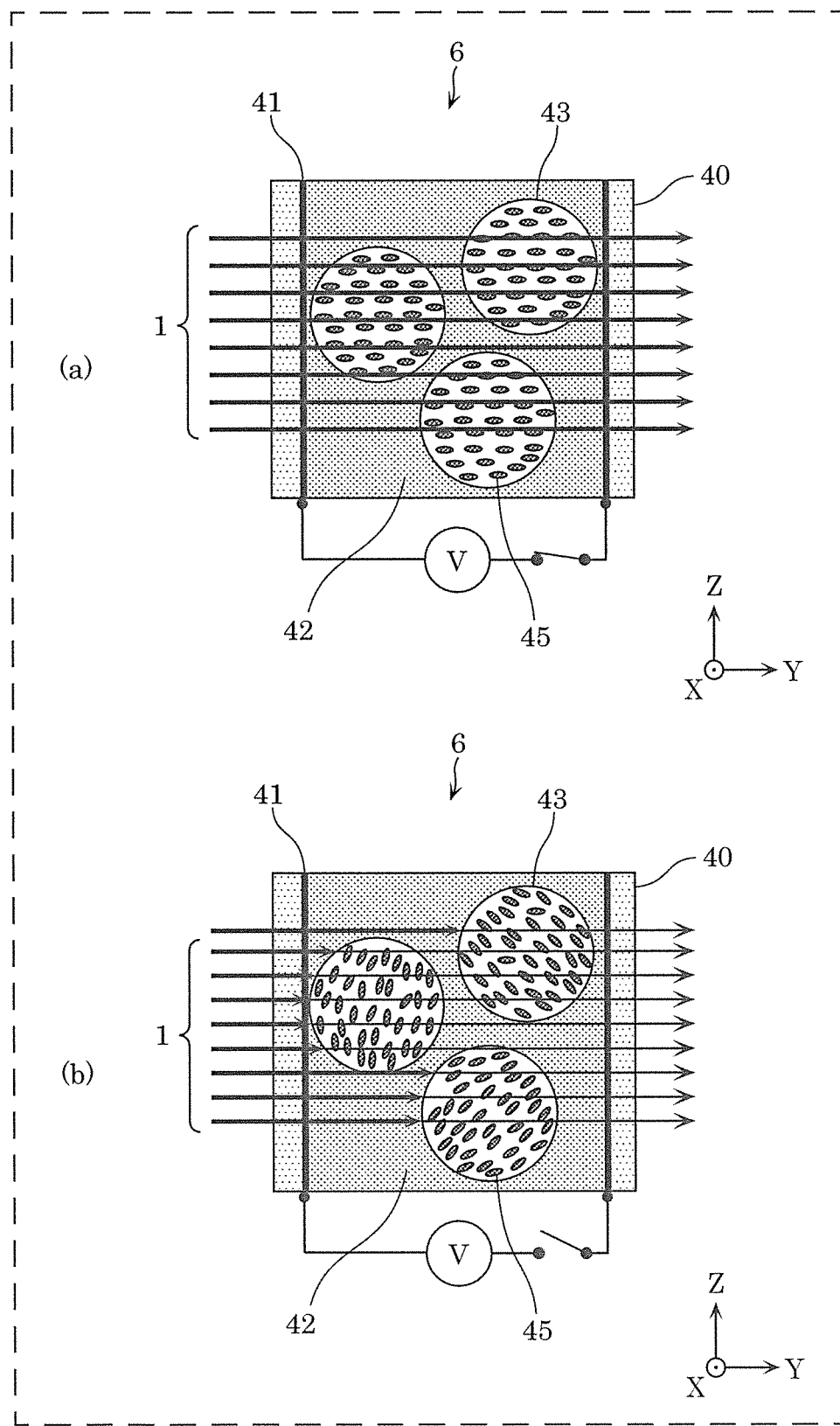
FIG. 4 is a sectional view illustrating a configuration of one example of a tinted film.

FIG. 4 is a diagram illustrating a configuration of one example of tinted film 6 in Embodiment 1. FIG. 4 illustrates a cross-section of tinted film 6 in FIG. 3 cut orthogonal to the viewed surface. (a) of FIG. 4 is a diagram illustrating a state where voltage is applied to tinted film 6, that is, the transparent state. (b) of FIG. 4 is a diagram illustrating a state where voltage is not applied to tinted film 6, that is, the decreased transmittance state. In (a) and (b) of FIG. 4, tinted film 6 includes transparent electrode film 41 on facing surfaces of a pair of substrates 40. Transparent electrode film 41 is made of a transparent electrode material, such as metal oxide such as indium tin oxide (ITO). Tinted film 6 further includes special polymer 42 contained between transparent electrode films 41, and capsules 43 which are gaps present within special polymer 42. Capsule 43 encapsulates tinted liquid crystal molecules 45. The pair of substrates 40 can be formed of any material as long as their transparency can be ensured. For example, the pair of substrates 40 are glass substrates or acrylic substrates. Special polymer 42 may have transparency. Although not illustrated, tinted film 6 according to the present embodiment may include a spacer which defines a constant thickness between transparent electrode films 41, or a sealant which seals transparent electrode films 41.

As illustrated in (a) of FIG. 4, in tinted film 6, when voltage is applied between transparent electrode films 41, the long sides of tinted liquid crystal molecules 45 are aligned approximately orthogonal to the pair of substrates 40. Thereby, projection light 1 is transmitted without being absorbed. In other words, the application of voltage converts tinted film 6 into the transparent state where projection light 1 is transmitted without being absorbed. As illustrated in (b) of FIG. 4, in tinted film 6, when voltage is not applied between transparent electrode films 41, tinted liquid crystal molecules 45 are irregularly arranged due to the action of special polymer 42. Thereby, tinted film 6 absorbs projection light 1. In other words, without the application of voltage, tinted film 6 is converted into the decreased transmittance state where projection light 1 is absorbed. Thereby, projection light 1 is absorbed. The degree of light absorption of tinted liquid crystal molecule 45 can be controlled through variation of the voltage to be applied.

Although the transparent state and the decreased transmittance state in the case of projection light 1 have been described above, the same applies to external light 10. In other words, the application of voltage converts tinted film 6 into the transparent state where external light 10 transmits without being absorbed. Without application of voltage, tinted film 6 is converted into the decreased transmittance state where external light 10 is absorbed.

Tinted film 6 can contain any substance than tinted liquid crystal molecule 45. Tinted film 6 can contain any substance enabling such a conversion between the transparent state and the decreased transmittance state. The voltage to be applied to tinted film 6 in Embodiment 1 is an AC voltage of about 0 to 50 V. Any voltage can be applied.

Figure 5:
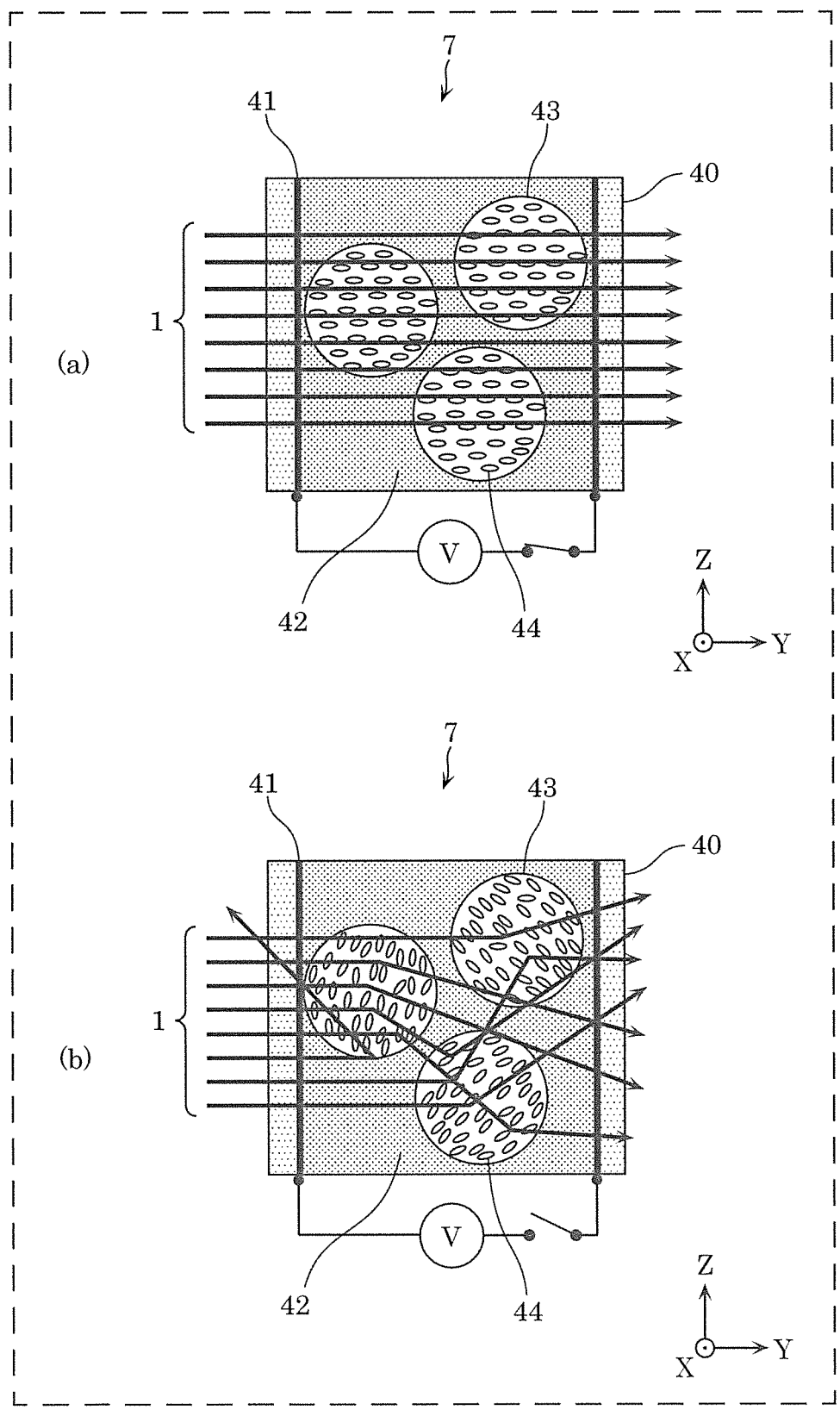
FIG. 5 is a sectional view illustrating a configuration of one example of a diffusion film.

Diffusion film 7 diffuses projection light 1 projected from projector 11. In Embodiment 1, diffusion film 7 is a liquid crystal element. FIG. 5 is a configuration of one example of diffusion film 7 according to Embodiment 1. FIG. 5 illustrates a cross-section of diffusion film 7 in FIG. 3 cut orthogonal to the viewed surface. (a) of FIG. 5 is a diagram illustrating a state where voltage is applied to diffusion film 7, that is, a non-diffusion state. (b) of FIG. 5 is a diagram illustrating a state where voltage is not applied to diffusion film 7, that is, a diffusion state. In (a) and (b) of FIG. 5, diffusion film 7 includes transparent electrode film 41 on facing surfaces of a pair of substrates 40. Transparent electrode film 41 is made of a transparent electrode material, such as metal oxide such as indium tin oxide (ITO). Diffusion film 7 further includes special polymer 42 contained between transparent electrode films 41, and capsules 43 which are gaps present within special polymer 42. Capsule 43 encapsulates diffusive liquid crystal molecule 44. The pair of substrates 40 can be formed of any material as long as their transparency can be ensured. For example, the pair of substrates 40 are glass substrates or acrylic substrates. Special polymer 42 may have transparency. Although not illustrated, diffusion film 7 according to the present embodiment may include a spacer which defines a constant thickness between transparent electrode films 41, or a sealant which seals transparent electrode films 41.

As illustrated in (a) of FIG. 5, in diffusion film 7, when voltage is applied between transparent electrode films 41, the long sides of diffusive liquid crystal molecules 44 are aligned approximately orthogonal to the pair of substrates 40. Thereby, projection light 1 is transmitted without being diffused. In other words, the application of voltage converts diffusion film 7 into a non-diffusion state (transparent state) where projection light 1 is transmitted without being diffused. In this state, viewer 18 can see only projection light 1 from projector 11 and cannot view an image on the viewed surface of display panel 30a. As illustrated in (b) of FIG. 5, when voltage is not applied between transparent electrode films 41, in diffusion film 7, diffusive liquid crystal molecules 44 are irregularly arranged due to the action of special polymer 42 to diffuse projection light 1. In other words, without the application of voltage, diffusion film 7 is converted into the diffusion state where projection light 1 is diffused. Thereby, projection light 1 is diffused, and viewer 18 can recognize an image on the viewed surface of display panel 30a. The degree of diffusion of the liquid crystal element can be controlled through variation of the voltage to be applied.

In the case of diffusion film 7 described with reference to FIG. 5, display panel 30a can be converted into the non-diffusion state through the application of voltage to diffusion film 7 when an image is not projected onto display panel 30a. For this reason, viewer 18 can see a state of the space where projector 11 is installed, or its surrounding scenery; or the difference in appearance between display panel 30a and the glass surrounding display panel 30a can be reduced.

Although diffusion film 7 has been described above as a liquid crystal element having a variable degree of diffusion through the application of voltage, any diffusion film can be used. Any diffusion film 7 which enables predetermined diffusion can be used. In other words, diffusion film 7 whose degree of diffusion cannot be controlled can also be used. Examples thereof include a film for a projection screen having a predetermined degree of diffusion. In this case, in the state where projection light 1 is not projected from projector 11, display panel 30a is cloudy or in a dimly lit state. Such display panel 30a can reduce external light 10 which enters display panel 30a from the space where projector 11 is installed, thus reducing the influences of external light 10 over the space where viewer 18 is present.

In the positional relation between tinted film 6 and diffusion film 7, tinted film 6 is disposed remoter from projector 11 than diffusion film 7 is (i.e., viewer 18 side), and diffusion film 7 is disposed remoter from viewer 18 than tinted film 6 is (i.e., the side on which projector 11 is installed). In other words, tinted film 6 is disposed at a position where external light 10 enters, and diffusion film 7 is disposed at a position where projection light 1 from projector 11 enters.

Antireflective AR film 8 is disposed on the surfaces of the two pieces of glass 9, that is, the glass surface which projection light 1 from projector 11 enters and the glass surface which receives external light 10. Antireflective AR film 8 disposed on the glass surface which receives external light 10 has a role to reduce reflected light 3a, which is external light 10 entering glass 9 and then reflected on the surface of glass 9, and thus reduces a reduction in contrast by reflected light 3a. Antireflective AR film 8, which is disposed on the glass surface which projection light 1 from projector 11 enters, reduces reflected light 4, which is projection light 1 reflected on the surface of glass 9. Antireflective AR film 8 may be formed, for example, by applying an AR coating formed of a dielectric multi-layer film made of silicon dioxide ($SiO_2$) or titanium dioxide ($TiO_2$) onto the surface of glass 9 or by bonding a film having anti-reflective function to the surface of glass 9.

The two pieces of glass 9 include tinted films 6 and diffusion films 7 therebetween. Tinted films 6 and diffusion films 7 are bonded to the facing surfaces of the two pieces of glass 9 with intermediate film 5 interposed therebetween. In other words, display panel 30a includes glass 9, intermediate film 5, diffusion film 7, intermediate film 5, tinted film 6, intermediate film 5, and glass 9 disposed in this order from the entering direction of projection light 1 from projector 11. Glass 9 is soda lime glass, for example. Glass 9 can be replaced with any other substrate. Glass 9 may be a transparent resin substrate, such as an acrylic substrate, for example. Viewer 18 can directly touch the two pieces of glass 9. To prevent breakage of glass 9 by contact, glass 9 may be glass having a surface reinforced through chemical reinforcement treatment.

With reference to FIG. 1, controller 12, illuminance sensor 13, and control lines will now be described.

Controller 12 is connected to the components through tinted film control line 14, diffusion film control line 15, and illuminance sensor control line 17 to control the corresponding components. Specifically, controller 12 is connected to tinted film 6 through tinted film control line 14 to control the transmittance of tinted film 6 according to the illuminance sensed by illuminance sensor 13. Controller 12 is also connected to diffusion film 7 through diffusion film control line 15 to control the degree of diffusion of projection light 1 which enters diffusion film 7. Diffusion film 7 not allowing the control of the degree of diffusion may also be used. In this case, diffusion film control line 15 does not need to be disposed.

Controller 12 is also connected to projector 11 through projector control line 16 to identify whether projector 11 receives an instruction to project an image or not or to switch the content to be displayed. The instruction to project an image or to switch the content to be displayed is given by a clerk in the place where transparent screen 30 is installed, rather than by viewer 18. The instruction to project an image or to switch the content to be displayed can be given by any other method. For example, an image may be projected or the content to be displayed may be switched in response to the recognition of viewer 18 with a camera. In the recognition with a camera, for example, the target for recognition may be a person or may be a gesture of the person. Alternatively, for example, an image may be projected or the content to be displayed may be switched according to an instruction from a terminal device, such as a smartphone.

In the case where viewer 18 gives an instruction to project an image to projector 11, controller 12 controls the transmittance of tinted film 6 and the degree of diffusion of diffusion film 7, and displays the image on the viewed surface of display panel 30a which viewer 18 views. Controller 12 does not need to be connected to projector 11 through projector control line 16 as long as controller 12 can identify whether viewer 18 gives an instruction to project an image to projector 11 or not.

Controller 12 is also connected to illuminance sensor 13 through illuminance sensor control line 17, and receives the illuminance of external light 10 sensed by illuminance sensor 13 to control the transmittance of tinted film 6 through tinted film control line 14 according to the received illuminance. Controller 12 may be integrated in display panel 30a. Controller 12 includes an optical table having information of the relation between the power supply which generates the voltage to be applied to tinted film 6 and diffusion film 7, the range of the illuminance, and the corresponding transmittance of tinted film 6. A single optical table may be provided. Alternatively, several optical tables may be provided, and viewer 18 may select one of the optical tables.

When projector 11 does not project an image, controller 12 does not need to control the transmittance of tinted film 6. For example, when projector 11 does not project an image, tinted film 6 reaches the lowest transmittance without voltage applied to tinted film 6, or reaches the highest transmittance by applying voltage to tinted film 6. At this time, controller 12 does not control the transmittance of tinted film 6 even when the illuminance sensed by illuminance sensor 13 changes. In other words, irrespective of the illuminance of external light 10, the transmittance of tinted film 6 can be kept in its lowest or highest state when projector 11 does not project an image. Tinted film 6 can have any transmittance when projector 11 does not project an image. Based on an instruction from viewer 18, controller 12 may keep the specified transmittance.

Illuminance sensor 13 senses the illuminance of a site where transparent screen 30 is installed. Specifically, illuminance sensor 13 senses the illuminance of a site where tinted film 6 of transparent screen 30 is located. In other words, illuminance sensor 13 measures the illuminance of external light 10 received by the viewed surface of display panel 30a, and transmits the measured illuminance to controller 12 through illuminance sensor control line 17. Illuminance sensor 13 is disposed on the outermost surface of display panel 30a, for example. In such a configuration, the illuminance of external light 10 received by the viewed surface of display panel 30a can be measured, and the transmittance of tinted film 6 can be controlled according to the illuminance of the outermost surface of the viewed surface of display panel 30a. In other words, the illuminance of external light 10 which enters the surface of display panel 30a and affects the image to be viewed by viewer 18 can be measured. For this reason, the influences of external light 10 over the image to be viewed by viewer 18 can be reduced through control of the transmittance of tinted film 6 according to the illuminance.

Illuminance sensor 13 is disposed in a region not irradiated with projection light 1 from projector 11. For example, a region where any image is not displayed is included in the outer periphery of display panel 30a. In display panel 30a having such a configuration, illuminance sensor 13 disposed in such a region is not irradiated with projection light 1 from projector 11, and can accurately measure the illuminance of external light 10. Illuminance sensor 13 can be installed at any other position. Illuminance sensor 13 can be installed at any position where the illuminance of external light 10 radiated to the viewed surface of display panel 30a can be accurately measured. Although FIG. 1 illustrates the case where a single illuminance sensor 13 is disposed, any number of illuminance sensors 13 can be disposed. At least one illuminance sensor 13 needs to be disposed, and two or more illuminance sensors may be disposed.

Although transparent screen 30 includes illuminance sensor 13 in the present embodiment, transparent screen 30 may have any other configuration. Transparent screen 30 does not need to include illuminance sensor 13. For example, controller 12 may obtain the illuminance sensed by an illuminance sensor disposed external to transparent screen 30, and may control the transmittance of tinted film 6 according to the obtained illuminance. At least the sensing of the illuminance of the site where transparent screen 30 is installed, i.e., the illuminance of external light 10 radiated to the viewed surface of display panel 30a (display surface) is required.

[1-2. Operation]

The operation of transparent screen 30 having such a configuration will now be described.

[1-2-1. Principle to Reduce Influences of External Light by Tinted Film]

First, the principle to reduce the influences of external light 10 through control of the transmittance of tinted film 6 will be described with reference to FIG. 3. Although the illuminance (unit: l x) of external light 10, the luminance (unit: l m) of projection light 1 from projector 11, and the luminance (unit: $cd/m^2$) of the viewed surface of display panel 30a have different definitions of brightness, these will be simply referred to as brightness. The arrows in the drawing indicate light beams.

In FIG. 3, when the viewed surface of display panel 30a receives external light 10, external light 10 is partly reflected on the surface of glass 9. At this time, reflected light 3a is extinguished by the action of antireflective AR film 8. Specifically, antireflective AR film 8 has a multi-layer structure. The light beams reflected on the layers of antireflective AR film 8 cancel each other by interference of light, resulting in the extinction of reflected light 3a. The reflectance of antireflective AR film 8 indicates the degree of extinction. The reflectance is calculated from the ratio of the reflected luminous flux to the received luminous flux (the physical quantity indicating the brightness of light passing through a face). For example, when antireflective AR film 8 has a reflectance of 2%, reflected light 3a has $2/100$ of the brightness of external light 10. For this reason, antireflective AR film 8 may have a lower reflectance, preferably 2% or less. Furthermore, the reflectance is more preferably 1% or less. This is because reflected light 3a more significantly affects a reduction in contrast as external light 10 is brighter, that is, the transmittance of tinted film 6 is lower.

External light 10 passes through antireflective AR film 8, glass 9, and intermediate film 5, and then enters tinted film 6. In Embodiment 1, tinted film 6 contains tinted liquid crystal molecule 45 whose transmittance can be controlled by the voltage to be applied. In other words, by varying the voltage to be applied, tinted film 6 can control the brightness of external light 10 passing through tinted film 6. For example, when the transmittance of tinted film 6 is 20% (from the optical table, the transmittance of tinted film 6 corresponding to the brightness of external light 10 is 20%) and external light 10 passes through tinted film 6, the brightness of external light 10 at this time is $2/10$ of the brightness of external light 10 when entering the surface of display panel 30a.

Furthermore, external light 10 passing through tinted film 6 is partially reflected on diffusion film 7. Diffusion film 7 does not include antireflective AR film 8. Accordingly, external light 10 is reflected as reflected light 3b while keeping the brightness after external light 10 passes through tinted film 6. External light 10 again passes through tinted film 6 as reflected light 3b. At this time, reflected light 3b is further extinguished. Specifically, after reflected light 3b passes through tinted film 6 having a transmittance of 20%, the brightness of reflected light 3b is $2/10$ of the brightness of reflected light 3b before passing through tinted film 6. Subsequently, reflected light 3b after passing through tinted film 6 is emitted from the viewed surface of display panel 30a. In other words, the brightness of reflected light 3b emitted from the viewed surface of display panel 30a is $4/100$ $(=(2/10)\times(2/10))$ of external light 10 which enters the viewed surface of display panel 30a. Transparent screen 30 having a such a configuration can significantly reduce the influences of external light 10 because external light 10 passes through tinted film 6 two times.

The cause to reduce the contrast is reflected light 3, which is a total of reflected light 3a reflected on antireflective AR film 8 and reflected light 3b reflected on diffusion film 7 and passing through tinted film 6 two times. As described above, transparent screen 30 can significantly extinguish both of reflected light 3a and reflected light 3b.

Although the transmittance of tinted film 6 is 20%, tinted film 6 can have any transmittance. Actually, external light 10 is reflected when entering intermediate film 5 from glass 9 and tinted film 6 from intermediate film 5. To reduce the reflection, glass 9, the substrate of tinted film 6, and intermediate film 5 may have refractive indices close to each other. The difference in refractive index is preferably 0.2 or less. The difference in refractive index is more preferably 0.1 or less.

Projection light 1 projected from projector 11 will now be described with reference to FIG. 3.

Projection light 1 passes through antireflective AR film 8, intermediate film 5, and diffusion film 7, and then enters tinted film 6. Tinted film 6 extinguishes not only external light 10 but also projection light 1. For this reason, at a transmittance of tinted film 6 of 20%, the brightness of projection light 1 after passing through tinted film 6 is $2/10$ of the brightness of projection light 1 before passing through tinted film 6. Projection light 1 passes through intermediate film 5 and glass 9, and is emitted from the viewed surface of display panel 30a as transmitted image 2. The brightness of transmitted image 2 is $2/10$ of the brightness of projection light 1.

As described above, while the brightness of projection light 1 and that of external light 10 both are reduced after the light passes through tinted film 6, projection light 1 passes through tinted film 6 one time and external light 10 passes through tinted film 6 two times. For this reason, reflected light 3b, which is the reflected external light 10, is extinguished two times. As a result, the degree of reduction in brightness after passing through tinted film 6 is larger in external light 10 than in projection light 1. Accordingly, transparent screen 30 according to Embodiment 1 is effective in providing a high contrast image even when the viewed surface of display panel 30a receives external light 10. The transmittance of tinted film 6 used in the description above is one example, and tinted film 6 can have any transmittance.

The case where external light 10 becomes brighter than in the state described above will now be described. Controller 12 performs control to decrease the transmittance of tinted film 6 when external light 10 sensed by illuminance sensor 13 is brighter. For example, the transmittance of tinted film 6 is decreased from 20% to 10% in this control. Thus, the brightness of reflected light 3b emitted from the viewed surface of display panel 30a is $1/100$ $(=(1/10)\times(1/10))$ of the brightness of external light 10 which enters the viewed surface of display panel 30a. Transparent screen 30 can more significantly reduce the influences of external light 10 than in the case where the transmittance of tinted film 6 is 20%. Accordingly, transparent screen 30 according to Embodiment 1 is also effective in providing a high contrast image even when external light 10 becomes brighter.

The case where external light 10 becomes dimmer than in the state described above will now be described. In this case, the influences of external light 10 over a reduction in contrast are small, and controller 12 performs control to increase the transmittance of tinted film 6. As a result, the degree of extinction of projection light 1 from projector 11 by tinted film 6 can be reduced. Thus, transparent screen 30 can display a brighter image.

[1-2-2. Operation in Embodiment 1]

Figure 6:
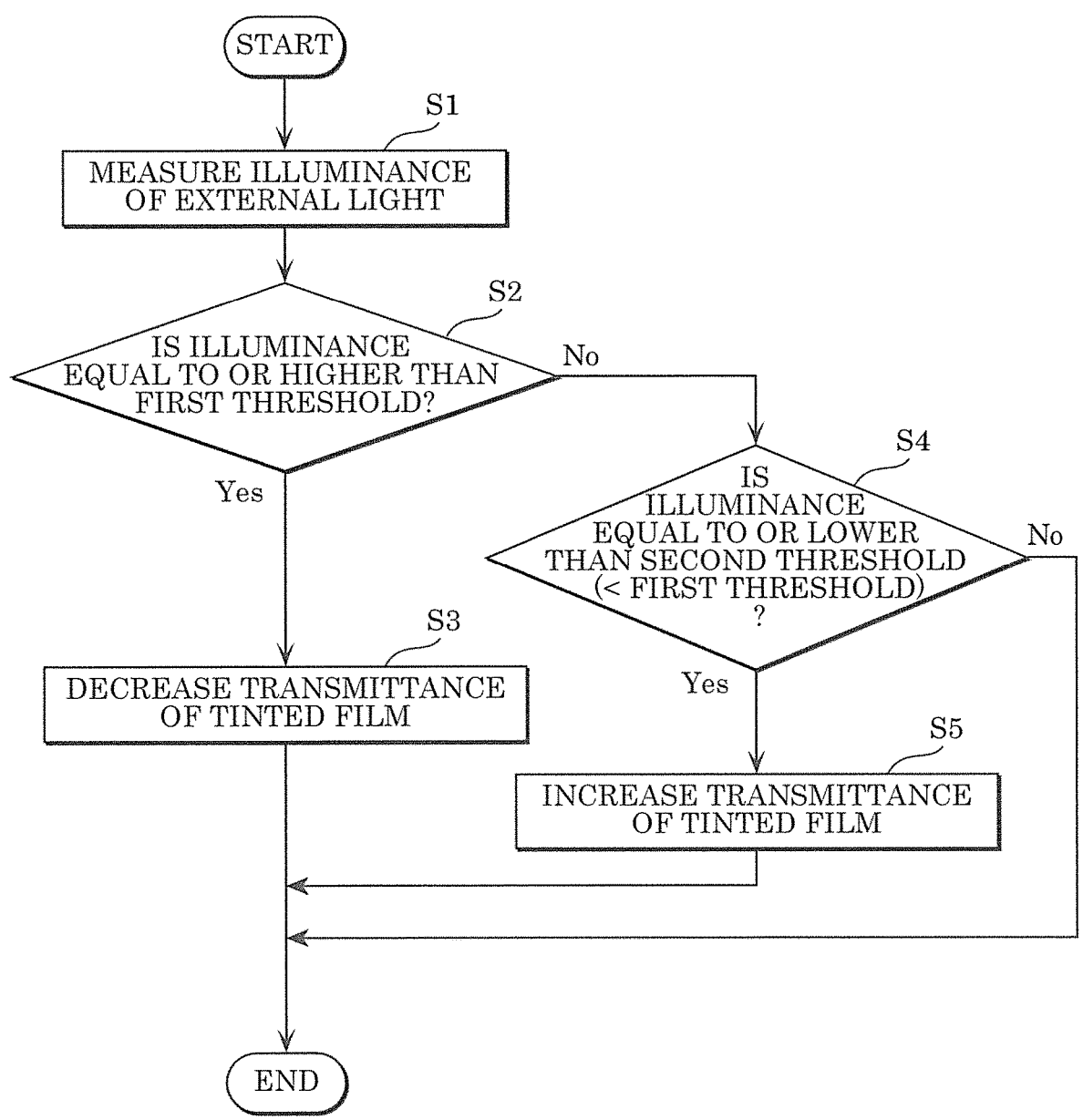
FIG. 6 is a flowchart illustrating the operation of a transparent screen according to Embodiment 1.

FIG. 6 is a flowchart illustrating the operation of transparent screen 30 according to Embodiment 1.

First, illuminance sensor 13 measures the illuminance of the light which enters the viewed surface of display panel 30a (S1). Illuminance sensor 13 then transmits the sensed illuminance to controller 12 through illuminance sensor control line 17. Controller 12 determines whether the illuminance sensed by illuminance sensor 13 is equal to or higher than a first threshold preset (S2) or not. When controller 12 determines that the illuminance sensed by illuminance sensor 13 is equal to or higher than the first threshold (Yes in S2), controller 12 controls so as to decrease the transmittance of tinted film 6 from the current value to reduce the influences of external light 10 (S3), because external light 10 is bright and the contrast may be reduced (the display on the viewed surface may be difficult to see). Specifically, controller 12 performs an operation to reduce the voltage applied to tinted film 6. For example, assume that the current illuminance of external light 10 is 300 lx, the transmittance of tinted film 6 at this time is 20%, and the first threshold is 400 lx, and the transmittance when the current illuminance of external light 10 is equal to or higher than the first threshold is 10%. Here, when the illuminance of external light 10 changes from 300 lx to 500 lx, the illuminance reaches a value equal to or higher than the first threshold. For this reason, controller 12 performs the operation to decrease the transmittance of tinted film 6 from 20% to 10%.

Controller 12 may control the transmittance of tinted film 6 after the change according to the difference between the first threshold and the illuminance of external light 10 being equal to or higher than the first threshold. For example, controller 12 changes the transmittance of tinted film 6 to 10% when the difference in illuminance is 100 lx or less, changes the transmittance of tinted film 6 to 5% when the difference in illuminance is more than 100 lx and 500 lx or less, and changes the transmittance of tinted film 6 to 3% when the difference in illuminance is more than 500 lx. The difference in illuminance and the transmittance of tinted film 6 can have any other relation.

When controller 12 determines that the illuminance sensed by illuminance sensor 13 is lower than the first threshold (No in S2) and is equal to or lower than a second threshold, which is lower than the first threshold (Yes in S4), controller 12 controls so as to increase the transmittance of tinted film 6 (S5) from the current value, because the influences of external light 10 are small. Specifically, controller 12 performs an operation to increase the voltage applied to tinted film 6. For example, assume that the current illuminance of external light 10 is 300 lx, the transmittance of tinted film 6 at this time is 20%, the second threshold is 200 lx, and the transmittance when the current illuminance is equal to or lower than the second threshold is 30%. Here, when the illuminance of external light 10 changes from 300 lx to 100 lx, the illuminance reaches a value equal to or lower than the second threshold lower than the first threshold. For this reason, controller 12 performs an operation to increase the transmittance of tinted film 6 from 20% to 30%.

Controller 12 may control the transmittance of tinted film 6 after the change according to the difference between the second threshold and the illuminance of external light 10 being equal to or lower than the second threshold. For example, controller 12 changes the transmittance of tinted film 6 to 30% when the difference in illuminance is 100 lx or less, changes the transmittance of tinted film 6 to 40% when the difference in illuminance is more than 100 lx and 150 lx or less, and changes the transmittance of tinted film 6 to 50% when the difference in illuminance is more than 150 lx. The difference in illuminance and the transmittance of tinted film 6 can have any other relation.

When controller 12 determines that the illuminance sensed by illuminance sensor 13 is lower than the first threshold and higher than the second threshold (No in S4), controller 12 does not change the transmittance of tinted film 6 because of a small change in illuminance, i.e., a small change from the current contrast. Specifically, controller 12 does not change the current value of the voltage applied to tinted film 6. For example, assume that the current illuminance of external light 10 is 300 lx, the transmittance of tinted film 6 at this time is 20%, the first threshold is 400 lx, and the second threshold is 200 lx. Here, when the illuminance of external light 10 changes to 350 lx, the illuminance is lower than the first threshold and higher than the second threshold. For this reason, controller 12 does not change the transmittance of tinted film 6. In other words, the transmittance of tinted film 6 is kept at 20%.

Although the above description has been performed using two thresholds, i.e., the first threshold and the second threshold, any other number of thresholds can be used. Three or more thresholds may be used. For example, a case where there is a third threshold whose illuminance is higher than the first threshold will be described. Assume that the current illuminance of external light 10 is 300 lx, the transmittance of tinted film 6 at this time is 20%, the first threshold is 400 lx, and the third threshold is 800 lx. Also assume that the corresponding transmittance of tinted film 6 is 10% when the illuminance of external light 10 is equal to or higher than the first threshold and is lower than the third threshold, and is 5% when the illuminance of external light 10 is equal to or higher than the third threshold. Here, a case where the illuminance of external light 10 changes from 300 lx to 1000 lx will be described. In the case where only the first threshold is used, as described above, controller 12 performs the operation to decrease the transmittance of tinted film 6 from 20% to 10%. In the case where the third threshold is used, controller 12 performs an operation to decrease the transmittance of tinted film 6 from 20% to 5% because the illuminance of external light 10 is equal to or higher than the third threshold. In other words, by use of the third threshold, the transmittance of tinted film 6 can be controlled to a transmittance more suitable for the illuminance of external light 10.

Alternatively, the transmittance of tinted film 6 may be controlled linearly rather than by using the thresholds as described above. Specifically, controller 12 may store an optical table containing information of the illuminance of external light 10 associated with the transmittance of tinted film 6. Every time when illuminance sensor 13 measures the illuminance, controller 12 may control the transmittance of tinted film 6 such that tinted film 6 has the transmittance associated with the sensed illuminance.

[1-3. Advantageous Effects]

As described above, transparent screen 30 according to one aspect of the present embodiment is transparent screen 30 which displays an image projected from projector 11. Transparent screen 30 includes display panel 30a including diffusion film 7 which diffuses projection light 1 from projector 11, and tinted film 6 which is disposed remoter from projector 11 than diffusion film 7 is and has a variable transmittance. Transparent screen 30 also includes controller 12. Controller 12 decreases the transmittance of tinted film 6 when the illuminance of the site where transparent screen 30 is installed is equal to or higher than the first threshold, and increases the transmittance of tinted film 6 when the illuminance of the site where transparent screen 30 is installed is equal to or lower than the second threshold, which is lower than the first threshold.

In such a configuration, controller 12 can control the transmittance of tinted film 6 to a value according to the illuminance of external light 10. In other words, transparent screen 30 can decrease the brightness of reflected light 3 derived from external light 10. For this reason, display panel 30a, even when receiving external light 10, is barely affected by external light 10, and more readily outputs a black display. Accordingly, transparent screen 30 can obtain a high contrast image even when the viewed surface (display surface) of display panel 30a receives external light 10.

The method of controlling transparent screen 30 according to one aspect of the present embodiment is a method of controlling transparent screen 30 which displays an image projected from projector 11. Transparent screen 30 includes diffusion film 7 which diffuses projection light 1 from projector 11, and tinted film 6 which is disposed remoter from projector 11 than diffusion film 7 is and has a variable transmittance. The method of controlling transparent screen 30 involves performing control to decrease the transmittance of tinted film 6 when the illuminance of the site where tinted film 6 is located is equal to or higher than the first threshold and to increase the transmittance of tinted film 6 when the illuminance is equal to or lower than the second threshold lower than the first threshold.

In this method, controller 12 can reduce a reduction in contrast caused by external light 10 even when display panel 30a receives external light 10. Accordingly, transparent screen 30 can have high contrast even when the viewed surface of display panel 30a receives external light 10.

Embodiment 2

Embodiment 2 will now be described with reference to FIGS. 7A to 9.

[2-1. Configuration]

The configuration of projection system 100 according to Embodiment 2 and the configuration of transparent screen 30 are the same as those of Embodiment 1 (FIG. 1), and their description will be omitted. Unlike Embodiment 1, controller 12 according to Embodiment 2 controls the luminance of projection light 1 from projector 11 through projector control line 16, which will be described below.

Controller 12 is connected to projector 11 through projector control line 16 to identify whether viewer 18 gives projector 11 an instruction to project an image or not, and to control the luminance of projection light 1 to be projected from projector 11. In other words, controller 12 controls both of the transmittance of tinted film 6 and the luminance of projection light 1 from projector 11. Controller 12 includes an optical table containing information of tinted film 6 associated with the power supply which generates the voltage to be applied to diffusion film 7, the range of the illuminance and its corresponding transmittance of tinted film 6, and the luminance of projection light 1 from projector 11. A single optical table may be used. Alternatively, several optical tables may be provided, and viewer 18 may select one of the optical tables.

Although an example in which transparent screen 30 includes illuminance sensor 13 has been described in the present embodiment, transparent screen 30 can have any other configuration. Transparent screen 30 does not need to include illuminance sensor 13.

[2-2. Operation]

The operation of projection system 100 having such a configuration will now be described below.

[2-2-1. Principle to Reduce Influences of External Light Through Control of Tinted Film and Projector]

Figure 7A:
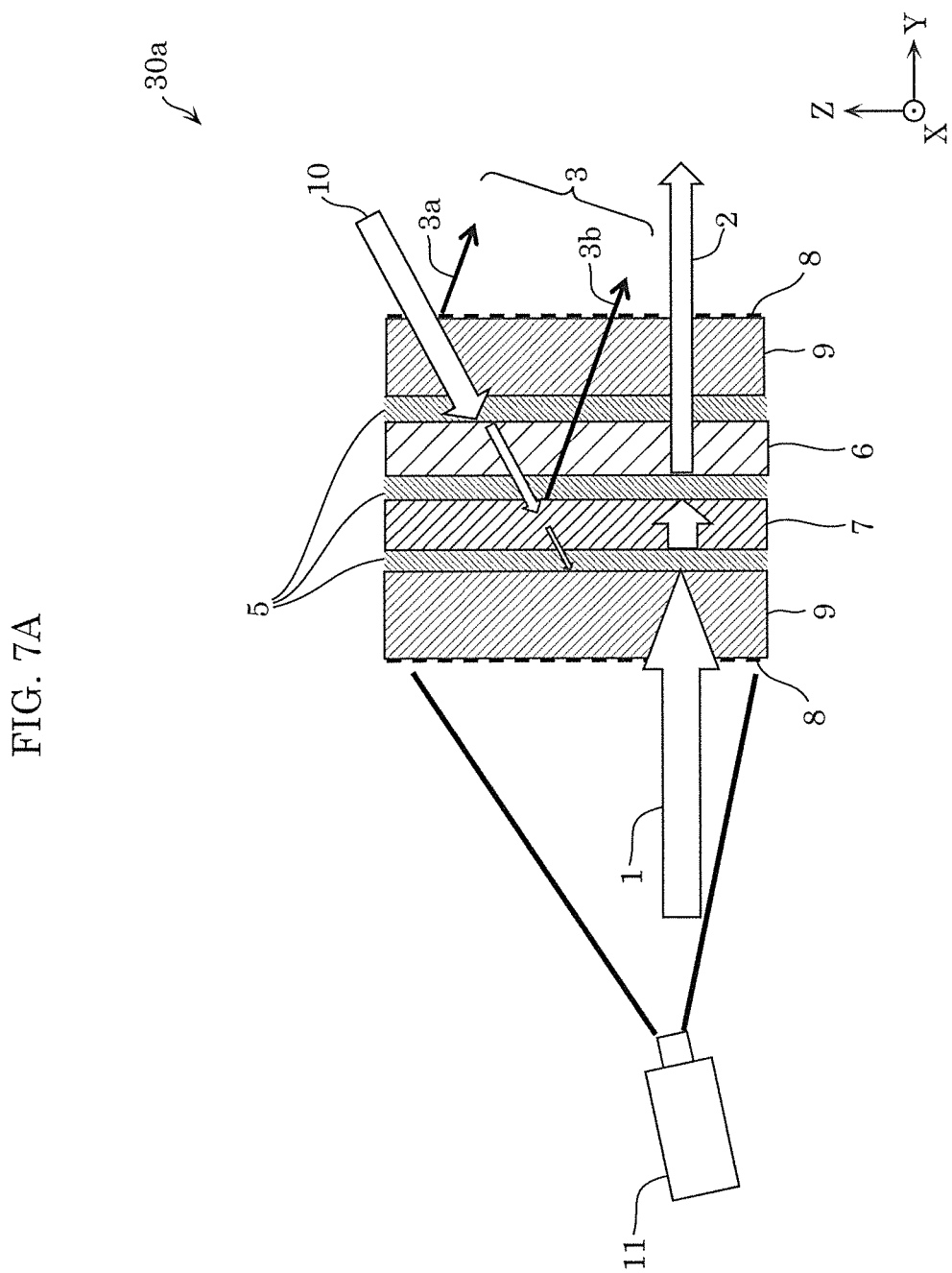
FIG. 7A is a sectional view illustrating a configuration of a display panel according to Embodiment 2.
Figure 7B:
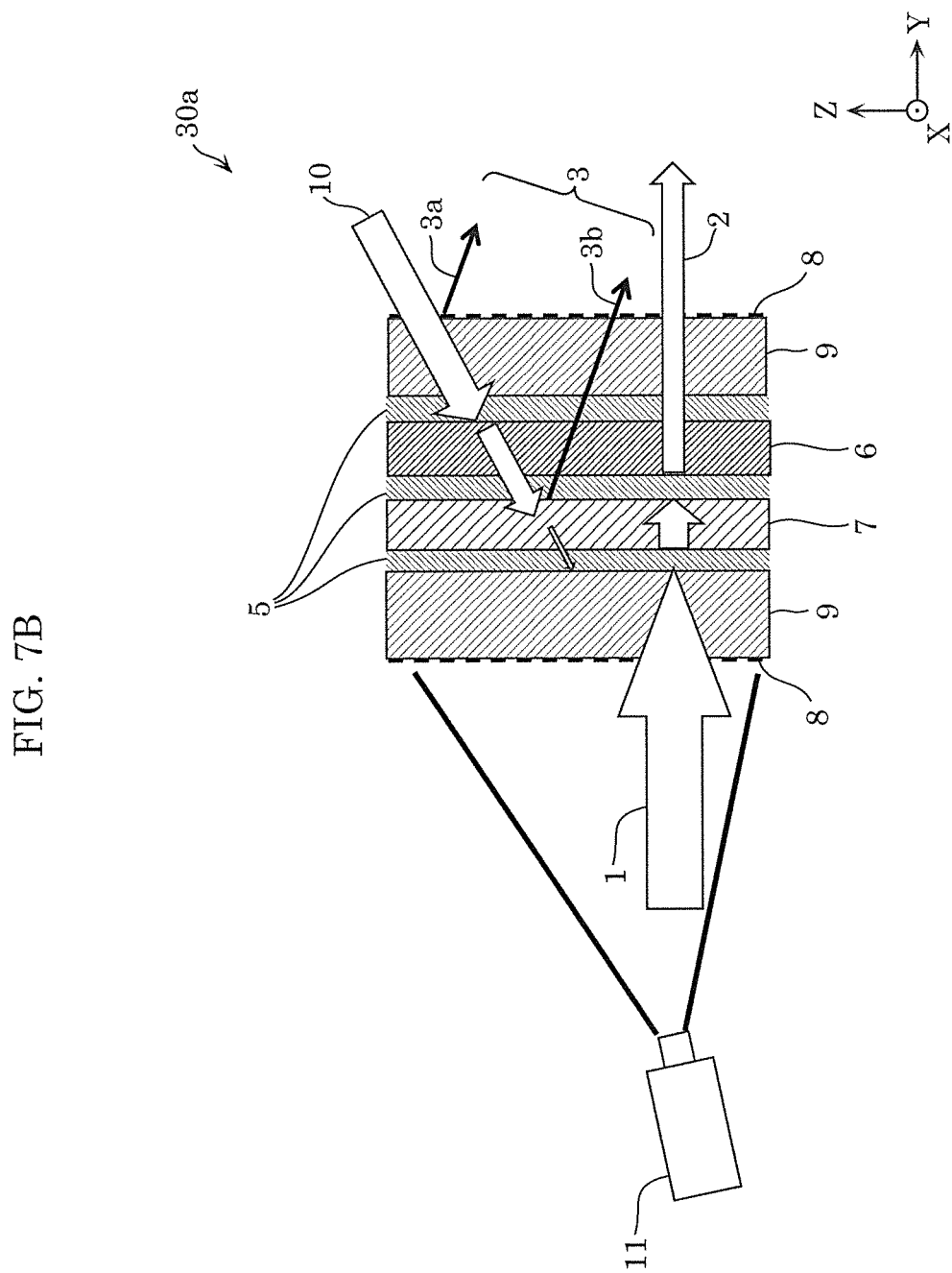
FIG. 7B is a sectional view illustrating exemplary adjustment of contrast according to Embodiment 2 when external light becomes brighter.
Figure 7C:
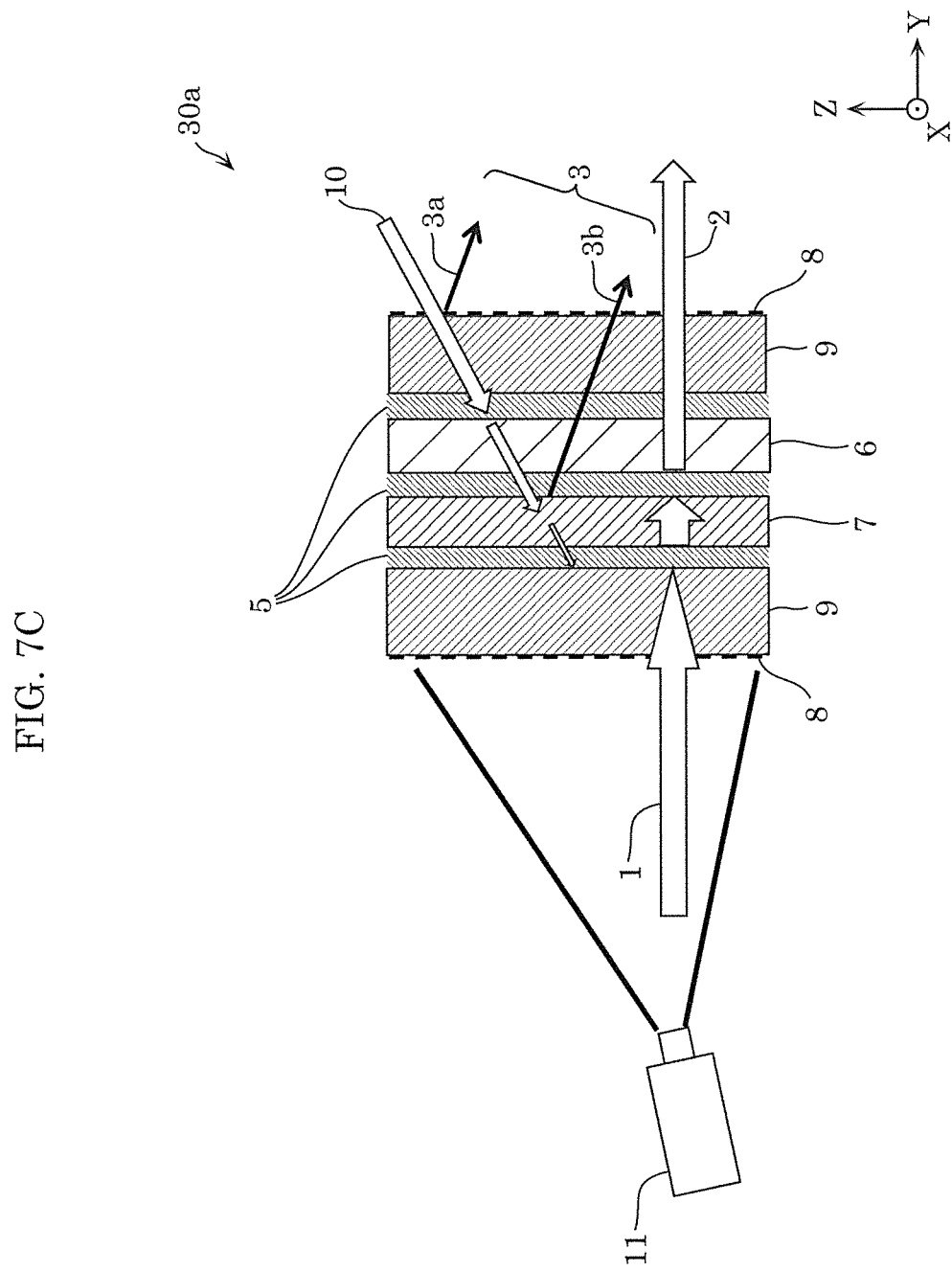
FIG. 7C is a sectional view illustrating exemplary adjustment of contrast according to Embodiment 2 when external light becomes dimmer.

First, the principle to reduce the influences of external light 10 through control of the transmittance of tinted film 6 and the brightness of projection light 1 from projector 11 will be described with reference to FIGS. 7A, 7B, and 7C. FIGS. 7A, 7B, and 7C illustrate projector 11 and a cross-section of display panel 30a cut orthogonal to the viewed surface of display panel 30a in FIG. 1. The arrows in the drawings indicate light beams. FIG. 7A is a sectional view illustrating a configuration of display panel 30a according to Embodiment 2. Controller 12 is connected to projector 11 through projector control line 16. FIG. 7B is a sectional view illustrating an exemplary adjustment of contrast when the illuminance of external light 10 sensed by illuminance sensor 13 is higher than that in FIG. 7A (Yes in S12 of FIG. 8). FIG. 7C is a sectional view illustrating an exemplary adjustment of contrast when the illuminance of external light 10 sensed by illuminance sensor 13 is lower than that of FIG. 7A (Yes in S14 of FIG. 8). The widths of the arrows indicating projection light 1, transmitted image 2, and external light 10 each represent the brightness of the light. In the drawings, brighter light is represented by a wider width. For example, of projection light 1 of FIG. 7A and projection light 1 of FIG. 7B, projection light 1 of FIG. 7B is represented by an arrow having a wider width. In other words, the widths thereof indicate that projection light 1 of FIG. 7B is brighter than projection light 1 of FIG. 7A. Similarly, of projection light 1 of FIG. 7A and projection light 1 of FIG. 7C, projection light 1 of FIG. 7A is represented by an arrow having a wider width. In other words, the widths thereof indicate that projection light 1 of FIG. 7C is dimmer than projection light 1 of FIG. 7A.

The hatching density of tinted film 6 represents the transmittance of tinted film 6. In the drawings, light having a lower transmittance is represented by higher hatching density. For example, of tinted film 6 of FIG. 7A and tinted film 6 of FIG. 7B, tinted film 6 of FIG. 7B has higher hatching density. In other words, tinted film 6 of FIG. 7B has a transmittance lower than that of tinted film 6 of FIG. 7A.

Similarly, of tinted film 6 of FIG. 7A and tinted film 6 of FIG. 7C, tinted film 6 of FIG. 7C has lower hatching density. In other words, tinted film 6 of FIG. 7C has a transmittance higher than that of tinted film 6 of FIG. 7A.

Although the illuminance of external light 10 (unit: lx), the luminance (unit: lm) of projection light 1 from projector 11, and the luminance (unit: $cd/m^2$) of the viewed surface of display panel 30a have different definitions of brightness, these will be simply referred to as brightness.

In FIG. 7A, the same principle as that in Embodiment 1 underlies a significant reduction in influences of external light 10 through external light 10 which passes through tinted film 6 two times. Thus, the description will be omitted in the present embodiment. In Embodiment 1, projection light 1 from projector 11 is also extinguished by tinted film 6, and in turn, the brightness of transmitted image 2 is also reduced. In contrast, in Embodiment 2, controller 12 also controls the brightness of projection light 1 from projector 11 in addition to the transmittance of tinted film 6. For example, a case where the transmittance of tinted film 6 is 20% will be described. In this case, the brightness of reflected light 3b emitted from the viewed surface of display panel 30a is $4/100$ $(=(2/10)\times(2/10))$ of the brightness of external light 10 which enters the viewed surface of display panel 30a. The brightness of projection light 1 from projector 11 after passing through tinted film 6 is $2/10$ of the brightness of projection light 1 from projector 11 before passing through tinted film 6. At this time, although brightness of projection light 1 from projector 11 after passing through tinted film 6 is $2/10$ of the brightness of projection light 1 from projector 11 before passing through tinted film 6, a brighter transmitted image 2 can be emitted from the viewed surface of display panel 30a by increasing the brightness of projection light 1 from projector 11.

Thereby, while projection light 1 is extinguished by tinted film 6, transmitted image 2 has increased brightness compared to that in Embodiment 1, and reflected light 3 has the same brightness as that in Embodiment 1.

Thus, transparent screen 30 according to Embodiment 2 has higher contrast than that in Embodiment 1. Accordingly, projection system 100 including transparent screen 30 according to Embodiment 2 is effective in providing higher contrast images even when the viewed surface of display panel 30a receives external light 10.

A case where external light 10 becomes brighter than in the state described above will be described. FIG. 7B is a diagram illustrating an exemplary adjustment of contrast when external light 10 in Embodiment 2 becomes brighter. Controller 12 performs control to decrease the transmittance of tinted film 6 when external light 10 sensed by illuminance sensor 13 is brighter (in the drawing, illustrated as external light 10 having a wide width), and performs control to increase the brightness of projection light 1 from projector 11 (in the drawing, illustrated as tinted film 6 having higher hatching density and projection light 1 having a wider width). For example, in this control, the transmittance of tinted film 6 is decreased from 20% to 10%, and the brightness of projection light 1 from projector 11 is increased from 3500 lm to 4500 lm. Thus, the brightness of reflected light 3b emitted from the viewed surface of display panel 30a is $1/100$ (=($1/10$)×($1/10$)) of the brightness of external light 10 which enters the viewed surface of display panel 30a.

The brightness of transmitted image 2 emitted from display panel 30a increases about 30% compared to the case in Embodiment 1 where the brightness of projection light 1 is not controlled. In such a configuration, transparent screen 30 can more significantly reduce the influences of external light 10 than the case where the transmittance of tinted film 6 is 20%, and transmitted image 2 can have a brighter state even when the transmittance of tinted film 6 is 10%. Accordingly, projection system 100 including transparent screen 30 according to Embodiment 2 is effective in providing higher contrast images even when external light 10 is brighter.

A case where external light 10 becomes dimmer than in the state described above will be described. FIG. 7C is a diagram illustrating an exemplary adjustment of contrast when external light 10 in Embodiment 2 becomes dimmer. When external light 10 becomes dimmer (in the drawing, illustrated as external light 10 having a narrow width), the influences of external light 10 over a reduction in contrast are decreased. Accordingly, controller 12 performs control to increase the transmittance of tinted film 6 and to decrease the brightness of projection light 1 from projector 11 (in the drawing, illustrated as tinted film 6 having low hatching density and as projection light 1 having a narrow width). This operation can reduce the degree of extinction of projection light 1 from projector 11 by tinted film 6, and therefore transparent screen 30 is effective in providing higher contrast images even when projection light 1 is dim. The light source for projector 11 can have lower brightness, which is also effective in energy saving.

The transmittance of tinted film 6 and the brightness of projection light 1 from projector 11 used above are only exemplary, and any other numeric values can be used. By controlling the transmittance of tinted film 6 and the brightness of projection light 1 from projector 11 so as to provide an approximately constant level of contrast, images having an approximately constant level of contrast can be viewed even when the brightness of external light 10 varies.

[2-2-2. Operation of Embodiment 2]

Figures 8, 9:
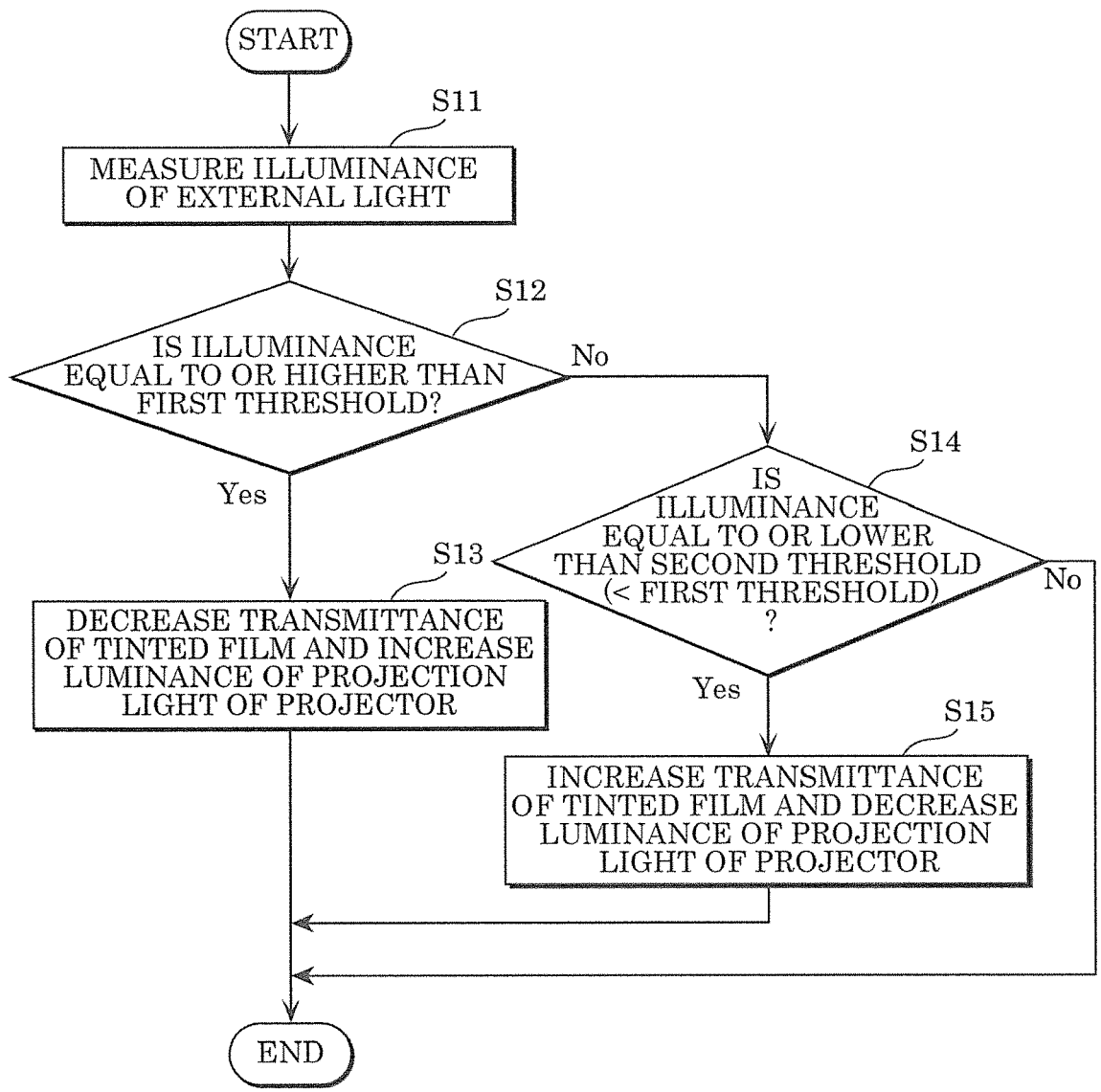
FIG. 8 is a flowchart illustrating an operation of a projection system according to Embodiment 2.
FIG. 9 is a table showing characteristics of Embodiment 2.

FIG. 8 is a flowchart illustrating the operation of projection system 100 according to Embodiment 2. FIG. 9 is a diagram illustrating characteristics when the illuminance of external light 10 in Embodiment 2 varies among the four illuminances, i.e., 100 lx, 300 lx, 500 lx, and 1000 lx. The operation in Embodiment 2 will be described with reference to FIGS. 8 and 9.

Here, the characteristics in FIG. 9 indicate the luminance of projection light 1 from projector 11, the transmittance of display panel 30a, the overall white luminance and overall black luminance measured from the viewed surface of display panel 30a, and the contrast when the contrast is controlled so as to be kept approximately constant at the four illuminances of external light 10 (in FIG. 9, 150:1). Here, the transmittance of display panel 30a indicates the entire transmittance of display panel 30a including the transmittance of tinted film 6. The transmittance of display panel 30a varies according to the illuminance of external light 10 through variation of the transmittance of tinted film 6. In other words, the transmittance of display panel 30a is controlled only through the control of the transmittance of tinted film 6. The overall white luminance indicates the luminance of the white display measured from the viewed surface of display panel 30a when the entire surface of display panel 30a displays white. The overall black luminance indicates the luminance of the black display measured from the viewed surface of display panel 30a when the entire surface of display panel 30a displays black. The contrast is calculated from the ratio of the overall black luminance to the overall white luminance. Accordingly, a higher contrast is attained at a higher overall white luminance and a lower overall black luminance. In other words, a higher overall white luminance and a lower overall black luminance generate sharper images to be viewed by viewer 18. A higher illuminance of external light 10 affects mainly the overall black luminance. Specifically, an increase in illuminance of external light 10 results in an increase in overall black luminance. In other words, irrespective of the black display by display panel 30a, the black display looks brighter due to reflected light 3. Such brighter black display reduces the contrast, reducing the sharpness of the images to be viewed by viewer 18.

In FIG. 8, first, illuminance sensor 13 measures the illuminance of light which enters the viewed surface of display panel 30a (S11). Illuminance sensor 13 then transmits the sensed illuminance to controller 12 through illuminance sensor control line 17. Controller 12 determines whether the illuminance sensed by illuminance sensor 13 is equal to or higher than the first threshold preset or not (S12). When controller 12 determines that the illuminance sensed by illuminance sensor 13 is equal to or higher than the first threshold (Yes in S12), external light 10 is bright and the contrast may be reduced. For this reason, to reduce the influences of external light 10, controller 12 performs control so as to decrease the transmittance of tinted film 6 from the current value and to increase the luminance of projection light 1 projected from projector 11 (S13). Specifically, controller 12 performs an operation to reduce the voltage applied to tinted film 6 and increase the luminance of the light source of projector 11. For example, in FIG. 9, assume that the current illuminance of external light 10 is 300 lx and the first threshold is 400 lx. Here, when the illuminance of external light 10 changes from 300 lx to 500 lx, controller 12 determines that the illuminance is equal to or higher than the first threshold, and performs an operation to increase the luminance of projection light 1 from projector 11 from 4000 lm to 5000 lm and decrease the transmittance of tinted film 6 such that the transmittance of display panel 30a is changed from 50% to 35%. The operation results in a contrast of 148:1. The overall black luminance at this time is 9 cd/m$^2$, which is changed only 1 cd/m² from the overall black luminance (8 cd/m²) at an illuminance of 300 lx. In other words, even when the illuminance increases from 300 lx to 500 lx, viewer 18 can view the black display substantially identical to the black display where external light 10 has an illuminance of 300 lx.

Controller 12 may control the luminance of projection light 1 projected from projector 11 and the transmittance of tinted film 6 after the change according to the difference between the first threshold and the illuminance of external light 10 which is equal to or higher than the first threshold.

Although the numeric values are different from those in FIG. 9, in an exemplary case where the difference in illuminance is 100 lx or less, controller 12 changes the luminance of projection light 1 from projector 11 from 4000 lm to 5000 lm and the transmittance of tinted film 6 such that transmittance of display panel 30a changes from 50% to 35%. In the case where the difference in illuminance is larger than 100 lx and 500 lx or less, controller 12 changes the luminance of projection light 1 from projector 11 from 4000 lm to 6000 lm and the transmittance of tinted film 6 such that the transmittance of display panel 30a changes from 50% to 31%. The difference in illuminance, the luminance of projection light 1 projected from projector 11, and the transmittance of tinted film 6 can have any other relation.

When controller 12 determines that the illuminance sensed by illuminance sensor 13 is lower than the first threshold (No in S12) and is equal to or lower than the second threshold which is lower than the first threshold (Yes in S14), the influences of external light 10 are small. For this reason, controller 12 controls so as to increase the transmittance of tinted film 6 from the current value and decrease the luminance of projection light 1 projected from projector 11 (515). Specifically, controller 12 performs an operation to increase the voltage applied to tinted film 6 and decrease the luminance of the light source of projector 11. For example, in FIG. 9, assume that the current illuminance of external light 10 is 300 lx and the second threshold is 200 lx. Here, when the illuminance of external light 10 changes from 300 lx to 100 lx, controller 12 determines that the illuminance is equal to or lower than the second threshold, and performs an operation to decrease the luminance of projection light 1 from projector 11 from 4000 lm to 1500 lm and increase the transmittance of tinted film 6 such that the transmittance of display panel 30a changes from 50% to 65%. This operation results in a contrast of 158:1. The overall black luminance at this time is 6 cd/m², which is 2 cd/m² lower than the overall black luminance (8 cd/m²) at an illuminance of 300 lx. In other words, when the illuminance decreases from 300 lx to 100 lx, viewer 18 can view a blacker display than the black display where external light 10 is 300 lx.

Controller 12 may control the luminance of projection light 1 projected from projector 11 and the transmittance of tinted film 6 after the change according to the difference between the second threshold and the illuminance of external light 10 which is equal to or lower than the second threshold. Although the numeric values are different from those in FIG. 9, in an exemplary case where the difference in illuminance is 100 lx or less, controller 12 changes the luminance of projection light 1 from projector 11 from 4000 lm to 1500 lm and the transmittance of tinted film 6 such that the transmittance of display panel 30a changes from 50% to 65%. In the case where the difference in illuminance is larger than 100 lx and 150 lx or less, controller 12 changes the luminance of projection light 1 from projector 11 from 4000 lm to 1000 lm and the transmittance of tinted film 6 such that the transmittance of display panel 30a changes from 50% to 70%. The difference in illuminance, the luminance of projection light 1 projected from projector 11, and the transmittance of tinted film 6 can have any other relation.

Controller 12 may control the transmittance of tinted film 6 after the change according to the difference between the second threshold and the illuminance of external light 10 which is equal to or lower than the second threshold. For example, when the difference in illuminance is 100 lx or less, controller 12 changes the transmittance of tinted film 6 to 30%. When the difference in illuminance is larger than 100 lx and 150 lx or less, controller 12 changes the transmittance of tinted film 6 to 40%. When the difference in illuminance is larger than 150 lx, controller 12 changes the transmittance of tinted film 6 to 50%. The difference in illuminance and the transmittance of tinted film 6 can have any other relation.

When controller 12 determines that the illuminance sensed by illuminance sensor 13 is lower than the first threshold and higher than the second threshold (No in S14), controller 12 does not change the transmittance of tinted film 6 and the luminance of projection light 1 from projector 11 from their current values because the potential change from the current contrast is small. Specifically, controller 12 does not change the voltage applied to tinted film 6 and the luminance of the light source of projector 11 from the current values. For example, assume that the current illuminance of external light 10 is 300 lx, the transmittance of tinted film 6 at this time is 20%, the first threshold is 400 lx, and the second threshold is 200 lx. Here, when the illuminance of external light 10 changes to 350 lx, controller 12 determines that the illuminance is lower than the first threshold and higher than the second threshold, and does not change the luminance of projection light 1 from projector 11 and the transmittance of display panel 30a. In other words, the luminance of projection light 1 from projector 11 remains 4000 lm, and the transmittance of display panel 30a remains 50%.

The first threshold and the second threshold after the illuminance of external light 10 changes, and controller 12 controls the luminance of projection light 1 from projector 11 and the transmittance of display panel 30a will now be described. Controller 12 controls the luminance of projection light 1 from projector 11 and the transmittance of display panel 30a, and then resets the first threshold and the second threshold. For example, the first threshold and the second threshold after the illuminance of external light 10 changes from 300 lx to 500 lx will be described. Assume that the first threshold is 400 lx and the second threshold is 200 lx when the illuminance of external light 10 is 300 lx. Subsequently, the illuminance of external light 10 changes to 500 lx. After controlling the luminance of projection light 1 from projector 11 and the transmittance of display panel 30a, controller 12 changes the first threshold and the second threshold. For example, controller 12 changes the first threshold from 400 lx to 800 lx and the second threshold from 200 lx to 400 lx. In this operation, controller 12 can control the luminance of projection light 1 from projector 11 and the transmittance of display panel 30a according to external light 10 when external light 10 becomes brighter. For example, when the illuminance of external light 10 increases from 500 lx to 1000 lx, controller 12 determines that the illuminance is equal to or higher than the first threshold (800 lx), and performs an operation to increase the luminance of projection light 1 from projector 11 from 5000 lm to 7000 lm and decrease the transmittance of tinted film 6 such that the transmittance of display panel 30a changes from 35% to 28%. This operation results in a contrast of 146:1. Subsequently, controller 12 again changes the first threshold (to a value higher than the current illuminance) and the second threshold (to a value lower than the current illuminance) according to the current illuminance of external light 10. In other words, controller 12 resets the first threshold and the second threshold every time when controller 12 controls the luminance of projection light 1 from projector 11 and the transmittance of display panel 30*a*.

Also when the illuminance again reduces from 500 lx to 300 lx, controller 12 resets the first threshold and the second threshold after controlling the luminance of projection light 1 from projector 11 and the transmittance of display panel 30*a*.

Although two thresholds, that is, the first threshold and the second threshold have been described above, any number of thresholds can be used. Three or more thresholds may be used. For example, the case where a third threshold for an illuminance is higher than the first threshold will be described. Assume that the current illuminance of external light 10 is 300 lx, the luminance of projection light 1 from projector 11 at this time is 4000 lm, the transmittance of display panel 30*a* is 50%, the first threshold is 400 lx, and the third threshold is 800 lx. Also assume that the corresponding luminance of projection light 1 from projector 11 and transmittance of display panel 30*a* are 5000 lm and 35%, respectively, when the illuminance of external light 10 is equal to or higher than the first threshold and lower than the third threshold, and are 7000 lm and 28%, respectively, when the illuminance of external light 10 is equal to or higher than the third threshold. Here, the case where the illuminance of external light 10 changes from 300 lx to 1000 lx will be described. When only the first threshold is used, as described above, controller 12 changes the luminance of projection light 1 from projector 11 from 4000 lm to 5000 lm and the transmittance of tinted film 6 such that the transmittance of the display panel changes from 50% to 35%. When the third threshold is used, in response to the illuminance of external light 10 changed to be equal to or higher than the third threshold, controller 12 changes the luminance of projection light 1 from projector 11 from 4000 lm to 7000 lm and the transmittance of tinted film 6 such that the transmittance of the display panel changes from 50% to 28%. In other words, by use of the third threshold, controller 12 can control the luminance of projection light 1 from projector 11 and the transmittance of tinted film 6 to values more suitable for the illuminance of external light 10.

Controller 12 resets the thresholds after the control of the luminance of projection light 1 from projector 11 and the transmittance of display panel 30*a*, as in the case where two thresholds are used. In this case, for example, when the illuminance of external light 10 changes from 300 lx to 1000 lx, controller 12 controls the luminance of projection light 1 from projector 11 and the transmittance of display panel 30*a*, and then resets the first threshold, the second threshold lower than the first threshold, and the third threshold to the thresholds suitable for the current illuminance of 1000 lx.

Alternatively, the transmittance of tinted film 6 and the luminance of projection light 1 from projector 11 may be controlled linearly rather than setting of the thresholds as described above. Specifically, controller 12 may store the data which associates the illuminance of external light 10, the transmittance of tinted film 6, and projection light 1 from projector 11. Every time when illuminance sensor 13 measures the illuminance, controller 12 may control the transmittance of tinted film 6 to the transmittance associated with the sensed illuminance and the luminance of projection light 1 from projector 11 to the luminance associated with the sensed illuminance.

As described above, the luminance of projection light 1 from projector 11 and the transmittance of display panel 30*a*, that is, the transmittance of tinted film 6 are controlled according to the illuminance of external light 10. Thereby, the contrast of the image display on the viewed surface of display panel 30*a* can be maintained at an approximately constant level. The numeric values described in the above results are only exemplary, and other numeric values are possible. For example, the target contrast to be maintained at an approximately constant level may be 150:1, or viewer 18 may select the target contrast to be maintained at an approximately constant level. Although the luminance of projection light 1 from projector 11 and the transmittance of display panel 30*a*, that is, the transmittance of tinted film 6 are controlled in Embodiment 2 such that the contrast is maintained at an approximately constant level, these may be controlled by any other method. For example, the luminance of projection light 1 from projector 11 and the transmittance of display panel 30*a* may be controlled such that the overall black luminance is maintained at an approximately constant level, or any other method can be used.

[2-3. Advantageous Effects]

As described above, projection system 100 according to one aspect of the present embodiment includes projector 11, and transparent screen 30 including display panel 30*a*. Display panel 30*a* includes tinted film 6, controller 12, and illuminance sensor 13. Illuminance sensor 13 measures the illuminance of external light 10 received by the viewed surface of display panel 30*a*. Based on the illuminance sensed by illuminance sensor 13, controller 12 controls the voltage to be applied to tinted film 6 and the luminance of the light source of projector 11 such that the contrast is maintained at an approximately constant level, thereby controlling the transmittance of tinted film 6 and the luminance of projection light 1 from projector 11.

In such an operation, the contrast of the image projected onto display panel 30*a* can be controlled at an approximately constant level even when the viewed surface of display panel 30*a* receives external light 10 and the illuminance of external light 10 changes. Accordingly, projection system 100 can have higher contrast even when the viewed surface of display panel 30*a* receives external light 10.

Moreover, in transparent screen 30 according to one aspect of the present embodiment, controller 12 performs control to decrease the transmittance of tinted film 6 and increase the luminance of the image projected from projector 11 when the illuminance of the site where transparent screen 30 is installed is equal to or higher than the first threshold. Controller 12 performs control to increase the transmittance of tinted film 6 and decrease the luminance of the image projected to projector 11 when the illuminance of the site where transparent screen 30 is installed is equal to or lower than the second threshold.

In this operation, when the illuminance increases in the site where transparent screen 30 is installed, controller 12 can increase the luminance of transmitted image 2 by decreasing the transmittance of tinted film 6 and increasing the luminance of projection light 1 from projector 11, compared to the control of only tinted film 6. In other words, transparent screen 30 can reduce a reduction in contrast caused by a reduction in luminance of transmitted image 2 after passing through tinted film 6. Accordingly, transparent screen 30 can provide high contrast even when display panel 30*a* receives external light 10.

Moreover, controller 12 controls such that the contrast of the image on display panel 30a is maintained at a constant level.

As a result, viewer 18 can view sharp images with high contrast because the contrast is maintained at a constant level even when the illuminance of external light 10 changes.

In addition, transparent screen 30 further includes illuminance sensor 13, and controller 12 performs the control as above according to the illuminance sensed by illuminance sensor 13.

In this operation, the illuminance of the site where transparent screen 30 is installed can be sensed using illuminance sensor 13 included in transparent screen 30.

Illuminance sensor 13 is disposed on the outermost surface of display panel 30a.

In such a configuration, illuminance sensor 13 can measure the illuminance of external light 10 received by the viewed surface of display panel 30a. For this reason, the transmittance of tinted film 6, or the transmittance of tinted film 6 and the luminance of projection light 1 from projector 11 can be controlled according to the illuminance of the viewed surface of display panel 30a.

Illuminance sensor 13 is disposed at a position where illuminance sensor 13 is insusceptible to projection light 1 from projector 11.

In such a configuration, illuminance sensor 13 does not receive projection light 1 from projector 11, and can accurately measure the illuminance of external light 10.

Controller 12 does not control the transmittance of tinted film 6 when projector 11 does not project an image.

In such a configuration, when projector 11 does not project an image, the transmittance of tinted film 6 can be maintained at a constant level even when the illuminance sensed by illuminance sensor 13 changes.

Diffusion film 7 is convertible between the diffusion state and the non-diffusion state.

Because of diffusion film 7 having such a property, when projector 11 does not project an image and diffusion film 7 is converted into the non-diffusion state, viewer 18 can see the circumstances of the space where projector 11 is installed or its surrounding scenery. In addition, the difference in appearance between display panel 30a and glass surrounding display panel 30a can be reduced.

Moreover, projection system 100 according to one aspect of the present embodiment includes projector 11, and transparent screen 30 which displays an image projected from projector 11.

In such a configuration, projection system 100 can display high contrast images through the control of the luminance of projection light 1 from projector 11 and the transmittance of display panel 30a, that is, the transmittance of tinted film 6 even when display panel 30a receives external light 10.

Embodiment 3

Embodiment 3 will now be described with reference to FIGS. 10A to 12B.

[3-1. Configuration and Exemplary Use]

Unlike projection systems 100 described in Embodiments 1 and 2, projection system 200 according to Embodiment 3 includes lighting device 50, which will be mainly described in the present embodiment. The transmittance of tinted film 6 or the transmittance of tinted film 6 and the luminance of projection light 1 from projector 11 are controlled according to the illuminance of external light by the same method as those in Embodiments 1 and 2, and the description thereof will be omitted.

Figure 10A:
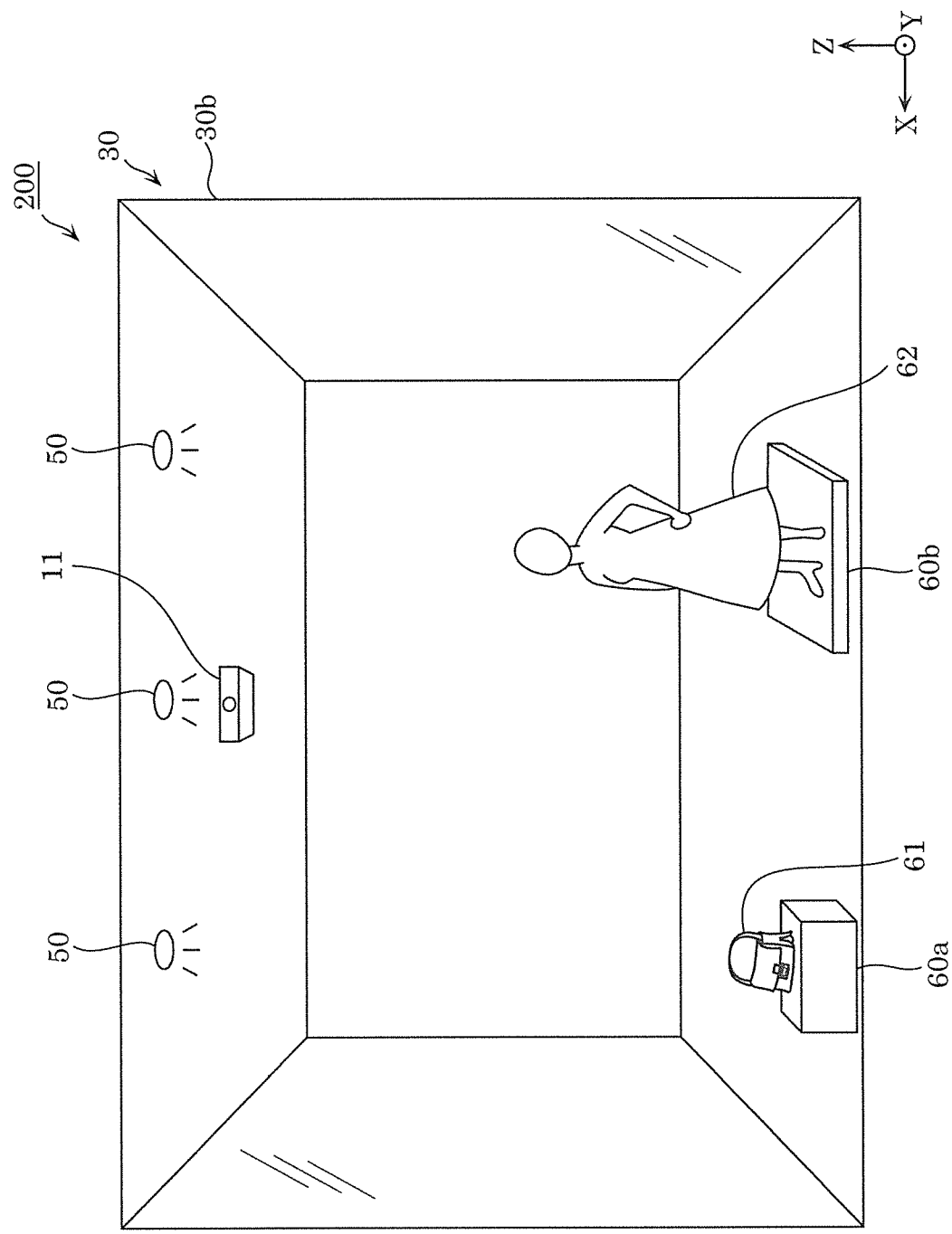
FIG. 10A is a diagram illustrating a configuration of a projection system according to Embodiment 3.
Figure 10B:
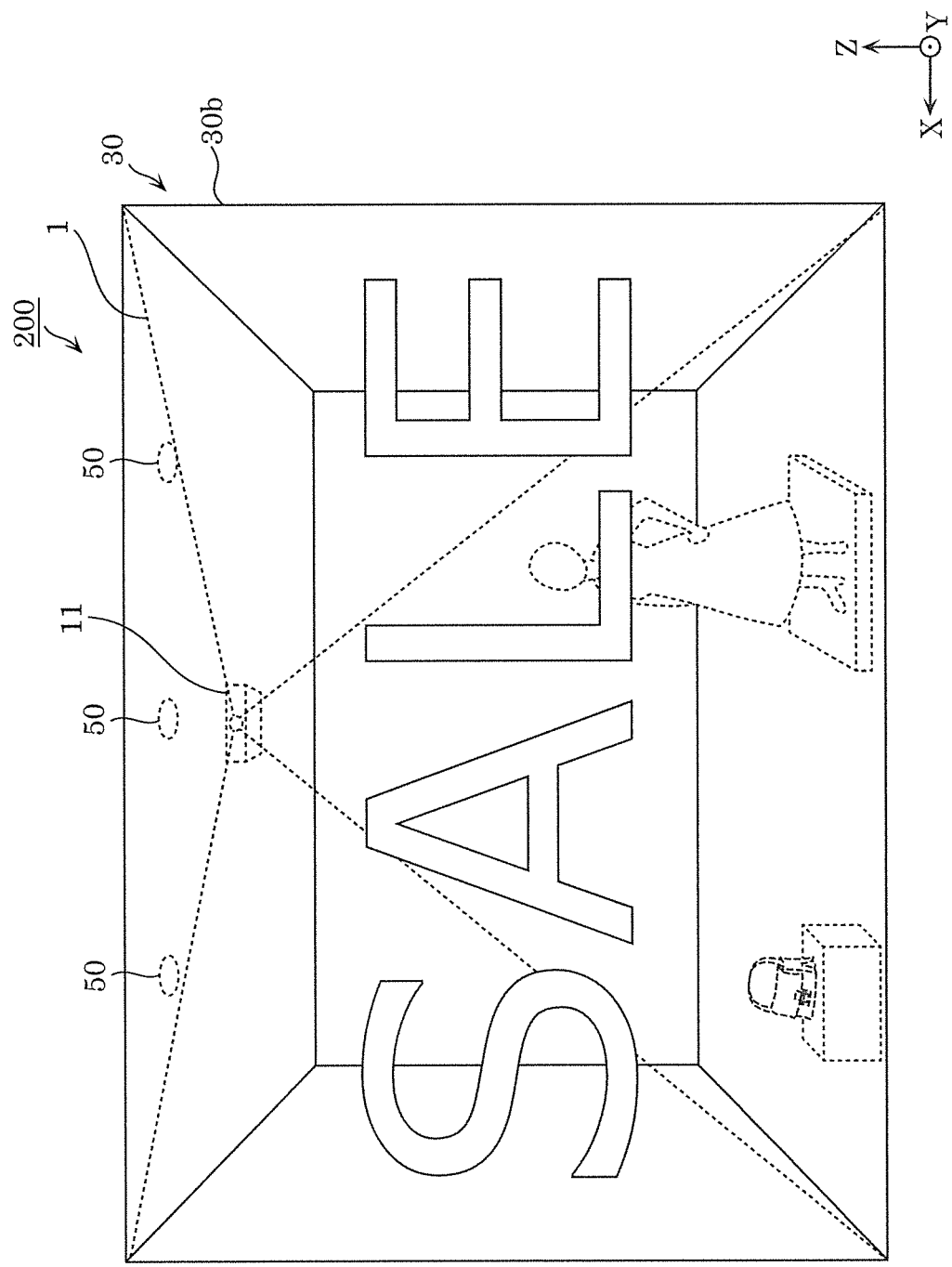
FIG. 10B is a diagram illustrating a state where an image is projected in a projection system according to Embodiment 3.

FIG. 10A is a drawing illustrating a configuration of projection system 200 according to Embodiment 3. Specifically, FIG. 10A is a drawing illustrating a state where an image is not projected onto display panel 30b in projection system 200 according to the present embodiment when projection system 200 is used as a store window. FIG. 10B is a drawing illustrating projection system 200 according to the present embodiment in a state where an image is projected. Specifically, FIG. 10B is a drawing illustrating projection system 200 according to the present embodiment in a state where an image is projected onto display panel 30b when projection system 200 is used as a store window. FIGS. 10A and 10B are drawn looking at the inside of a shop from a street (outside of the shop). Although a case where projection system 200 is used as a store window is exemplified in FIGS. 10A and 10B, projection system 200 can be used in any application. For example, projection system 200 can be used in a variety of applications, such as places near entrances of buildings, offices, platforms of railroad stations, and convention centers. Projection system 200 according to the present embodiment can also be used as part of a glass wall.

As illustrated in FIG. 10A, projection system 200 includes projector 11, display panel 30b, and lighting device 50. Although not illustrated, projection system 200 includes controller 12 and illuminance sensor 13. Display panel 30b, controller 12, and illuminance sensor 13 form transparent screen 30. As exemplary display items for the store window, bag 61 placed on stage 60a and dummy 62 placed on stage 60b are illustrated. In FIG. 10B, projection light 1 emitted from projector 11 is represented by dashed lines.

Projector 11 emits projection light 1 to display panel 30b to display (project) an image on(to) display panel 30b. The image to be displayed may be obtained from a Blu-ray player or a personal computer (not illustrated). In the present embodiment, an example where a Blu-ray player is used will be described.

In the present embodiment, projector 11 is installed on the ceiling in the shop. Projector 11 can be installed at any position. Projector 11 can be installed at any position allowing the emission of projection light 1 to display panel 30b. Examples of usable projector 11 include a short focus projector. Use of a short focus projector as projector 11 enables the installation of projector 11 at a position near display panel 30b in the shop. For example, projector 11 can be installed at a position near display panel 30b such as the ceiling or wall in the shop. Such an installation can increase the freedom of display items to be placed. For example, when projection light 1 is emitted from the back of the shop to display panel 30b, the display items are placed so as not to block projection light 1. In other words, the positions or sizes of display items to be placed are restricted. Use of the short focus projector can relax the restrictions on the positions or sizes of display items to be placed because display panel 30b can be irradiated with projection light 1 from a position near display panel 30b.

In the present embodiment, display panel 30b is used as a store window. In other words, when projector 11 emits projection light 1, an image is displayed on the glass of the store window. A viewer on a street (such as a passerby) can view (see) the image projected onto the glass of the store window. The surface of display panel 30b facing the street (face on the plus side of the Y-axis) is a surface which external light enters, and corresponds to the viewed surface (display surface).

Unlike display panels 30a described in Embodiments 1 and 2, display panel 30b includes sealing material 70. The details will be described later. In FIG. 10A, an image is not projected onto display panel 30b. Thus, display panel 30b is in the transparent state where the display items in the shop can be viewed from the street. The transparent state of display panel 30b indicates the state where voltage is applied to diffusion film 7 (see (a) of FIG. 4). Any voltage that can convert diffusion film 7 into a substantially transparent state can be applied to diffusion film 7.

Controller 12 performs the control of lighting device 50 described later in addition to the control of the illuminance of external light described in Embodiments 1 and 2. Controller 12 is implemented with a processor or dedicated circuit which reads a program from a built-in memory to execute the read program, for example. Controller 12 may be integrated with display panel 30b.

Illuminance sensor 13 senses the illuminance of external light which enters the viewed surface of display panel 30b from the outside of the shop. Illuminance sensor 13 does not need to be disposed in transparent screen 30.

Lighting device 50 is disposed inside the shop to radiate light (illumination light) to the space including display items, i.e., bag 61 and dummy 62. For example, in a plan view, lighting device 50 is disposed between projector 11 and display panel 30b (seen from the Z-axis direction). Lighting device 50 includes an adjustable light source. Here, the term "adjustable" indicates that the quantity of light can be adjusted stepwise and that only the operation to turn on and off can be controlled. In the present embodiment, lighting device 50 will be described by way of an example where only the operation to turn on and off is performed. The adjustment of lighting device 50 is controlled by controller 12, for example.

FIG. 10A illustrates an example where three lighting devices 50 emit illumination light to the space including bag 61 and dummy 62. Lighting device 50 is a downlight or a spotlight, for example. In the example of the present embodiment, lighting device 50 is illustrated as a downlight. Although three lighting devices 50 are illustrated in the example of FIG. 10A, any number of lighting devices 50 can be disposed.

The case where projector 11 emits projection light 1 will now be described. As one example, FIG. 10B illustrates an example where letters "SALE" are displayed on display panel 30b.

Projector 11 displays an image on display panel 30b through emission of projection light 1 to display panel 30b. Any image can be displayed on display panel 30b. For example, the image may be an image of display items or the description or advertisement of the commodities in the shop.

Display panel 30b is converted into the diffusion state to diffuse projection light 1 emitted from projector 11, thereby displaying the image. The term "display panel 30b in the diffusion state" involves the state where voltage is not applied to diffusion film 7 or a state where diffusion film 7 is substantially in the diffusion state although voltage is applied thereto. In other words, diffusion film 7 has a diffusion state of at least a level such that the image is visible when seen from the viewed surface of display panel 30b. When display panel 30b is in the diffusion state, the state inside the shop including display items such as bag 61 and dummy 62 can be never or barely viewed from the street.

In the example illustrated in FIG. 10B, projector 11 projects projection light 1, and lighting devices 50 are turned off. When lighting device 50 emits illumination light while projector 11 is emitting projection light 1, the illumination light is also emitted to display panel 30b. This results in a reduction in contrast of the image to be displayed on display panel 30b. For this reason, the quantity of illumination light emitted from lighting device 50 to display panel 30b can be reduced during a period in which projector 11 emits (projects) projection light 1. For example, the quantity of illumination light emitted to display panel 30b may be reduced by turning off lighting device 50 or reducing (lowering) the quantity of light from lighting device 50. Alternatively, the quantity of light to be emitted to display panel 30b may be reduced by changing the direction of the optical axis of the light source included in lighting device 50.

Figure 11:
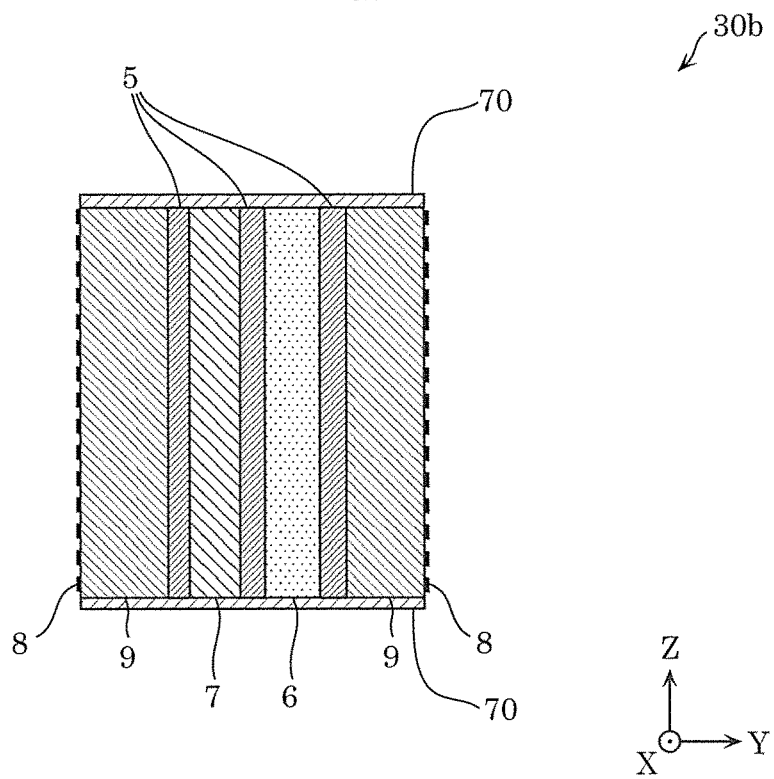
FIG. 11 is a sectional view illustrating a configuration of a display panel including a sealing material according to Embodiment 3.

Display panel 30b will now be described with reference to FIG. 11. FIG. 11 is a sectional view illustrating a configuration of display panel 30b including sealing material 70. FIG. 11 illustrates a cross-section of display panel 30b in FIGS. 10A and 10B cut orthogonal to the viewed surface (face horizontal to the YZ-plane).

As illustrated in FIG. 11, unlike display panel 30a according to Embodiment 1, display panel 30b according to the present embodiment includes sealing material 70. As illustrated in FIG. 4, tinted film 6 of display panel 30a includes special polymer 42 in direct contact with the ambient air. Specifically, special polymer 42 is in direct contact with the ambient air in a surface (hereinafter, referred to as lateral surface) orthogonal to the surface where transparent electrode film 41 is disposed. In other words, special polymer 42 is exposed from the lateral surface of tinted film 6. In this case, the invasion of gas containing water vapor from the lateral surface of tinted film 6 into special polymer 42 may degrade tinted film 6. Similarly, in diffusion film 7, the invasion of gas containing water vapor from the lateral surface of diffusion film 7 into special polymer 42 may degrade diffusion film 7 The degradation of at least one of tinted film 6 and diffusion film 7 by the gas containing water vapor results in a reduction in contrast of the image to be displayed on display panel 30b.

As illustrated in FIG. 11, display panel 30b according to the present embodiment includes sealing material 70 to reduce the degradation of tinted film 6 and diffusion film 7 by the gas containing water vapor. Sealing material 70 covers the lateral surfaces of display panel 30b. Specifically, sealing material 70 covers the entire lateral surfaces of display panel 30b. After glass 9, tinted film 6, diffusion film 7, and glass 9 are bonded with intermediate film 5, sealing material 70 is disposed on the lateral surfaces. The lateral surface of display panel 30b is a surface of the outer peripheral edge of display panel 30b orthogonal to the viewed surface of display panel 30b, the surface including the lateral surfaces of tinted film 6 and diffusion film 7.

Sealing material 70 is formed of a material having low moisture permeability or high airtightness. Sealing material 70 is formed of a fluorine coating material, a silicone sealing agent, or a metal deposited tape, for example. The metal deposited tape is a tape onto which aluminum is deposited, for example. Such a configuration can prevent the invasion of the gas containing water vapor into tinted film 6 and diffusion film 7, improving the reliability of display panel 30b.

Although an example in which sealing material 70 covers the entire lateral surfaces of display panel 30b has been described, any other configuration can be used. Sealing material 70 needs to cover at least the entire lateral surfaces of tinted film 6 and diffusion film 7.

In the case where the image is displayed in a wide region such as a store window, several display panels 30b may be aligned (connected) for use. For example, when two display panels 30b are connected, the facing lateral surfaces of two display panels 30b are connected to each other with a plastic frame or a silicone coating agent. In this case, even when a plastic frame or a silicone coating agent is used, sealing material 70 can be disposed on the lateral surfaces of display panel 30b to further reduce the invasion of the gas containing water vapor. Such a configuration can improve the reliability of display panel 30b even when several display panels 30b are aligned for use.

[3-2. Operation]

The operation of projection system 200 having such a configuration will now be described.

Figure 12A:
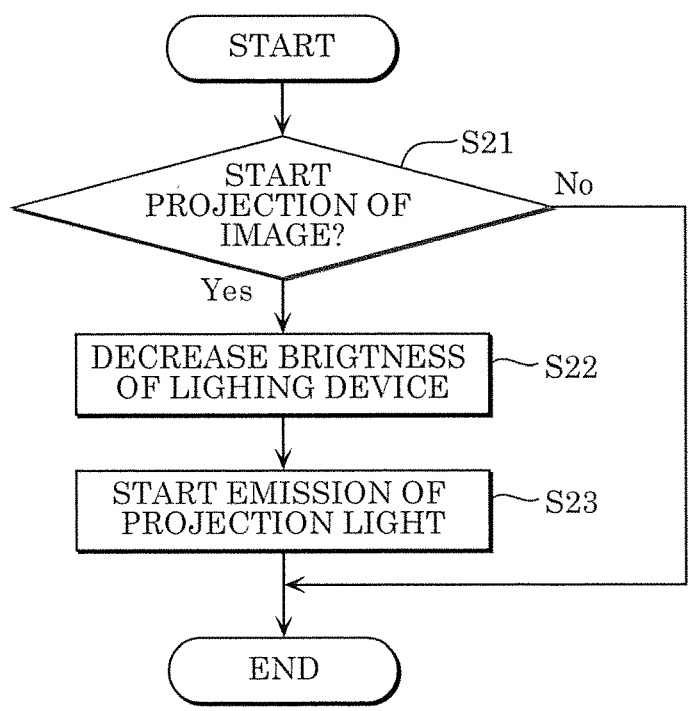
FIG. 12A is a flowchart illustrating an operation when a projector starts projection of projection light.

First, the operation to emit projection light 1 by projector 11 will be described with reference to FIG. 12A. FIG. 12A is a flowchart illustrating an operation to start the emission of projection light 1 by projector 11. In other words, FIG. 12A is a flowchart illustrating an operation to start the display of an image on display panel 30b.

When an image is not displayed on display panel 30b as illustrated in FIG. 10A, controller 12 determines whether to project (display) an image onto display panel 30b or not (S21). For example, when data (content) stored in a storage medium (such as a Blu-ray disc) is reproduced by a Blu-ray player, and is displayed on display panel 30b, based on the audio signal stored with image data, controller 12 may determine to project the image onto display panel 30b. Specifically, the image data for displaying an image on display panel 30b (hereinafter, referred to as display data), the audio signal (for example, 1 kHz), and the image data for not displaying an image on display panel 30b (hereinafter, referred to as non-display data) are preliminarily stored in the storage medium. The non-display data may be a blank image, for example. For this reason, when the data in the storage medium is reproduced by a Blu-ray player, the audio signal is also output during a period in which the display data is reproduced.

For example, the Blu-ray player outputs the image data (such as the display data and the non-display data) to projector 11, and outputs the audio signal to controller 12. During a period in which the Blu-ray player outputs the display data to projector 11, the Blu-ray player outputs the audio signal to controller 12. During a period in which the Blu-ray player outputs the non-display data to projector 11, the Blu-ray player does not output the audio signal to controller 12. When the audio signal is input from the Blu-ray player, for example, using the audio signal as a trigger, controller 12 determines to project the image onto display panel 30b. As a result, an image corresponding to the display data can be displayed on display panel 30b.

Controller 12 can use any other method to determine whether to project an image onto display panel 30b or not. For example, projection system 200 may include a human sensor (not illustrated). When the human sensor senses a person on the street near the store window, controller 12 may determine to project an image. Alternatively, controller 12 may include a timer (not illustrated). After a predetermined time has passed, controller 12 may determine to project the image. Moreover, a user (such as a clerk) may determine whether to project an image onto display panel 30b or not. In other words, based on the input from the user, controller 12 may determine to project the image.

When controller 12 determines to project an image onto display panel 30b (Yes in S21), controller 12 performs control to decrease the quantity of light from lighting device 50 (S22). In other words, the brightness of lighting device 50 is reduced compared to the case where the image is not projected. Although an example in which lighting device 50 is turned off has been described in FIG. 10B, controller 12 performs at least control such that the quantity of light of lighting device 50 during a period in which an image is projected is smaller than the quantity of light of lighting device 50 during a period in which an image is not projected. Such control can prevent a reduction by lighting device 50 in contrast of the image displayed on display panel 30b. When several lighting devices 50 are disposed, controller 12 controls the quantity of light of at least one lighting device 50.

Controller 12 then starts the emission of projection light 1 from projector 11 (S23). Specifically, controller 12 stops the voltage applied to diffusion film 7 of display panel 30b to convert diffusion film 7 into the diffusion state, and causes projector 11 to emit projection light 1 toward display panel 30b. Thereby, an image is displayed on display panel 30b. In the case where the image is displayed based on the audio signal, controller 12 controls such that the image is displayed on display panel 30b during a period in which the audio signal is input.

When controller 12 does not determine to project the image onto display panel 30b (No in S21), controller 12 does not perform the control to project an image. In other words, display panel 30b remains in the transparent state, projector 11 does not emit projection light 1, and the quantity of light of lighting device 50 remains large (bright).

Although an example in which Step S23 is performed after Step S22 has been described, the steps can be performed in any order. For example, Step S22 and Step S23 may be performed at the same time, or Step S23 may be performed before Step S22. The control of external light by controller 12 according to the illuminance, which has been described in Embodiments 1 and 2, is started in parallel with Step S23, for example.

Figure 12B:
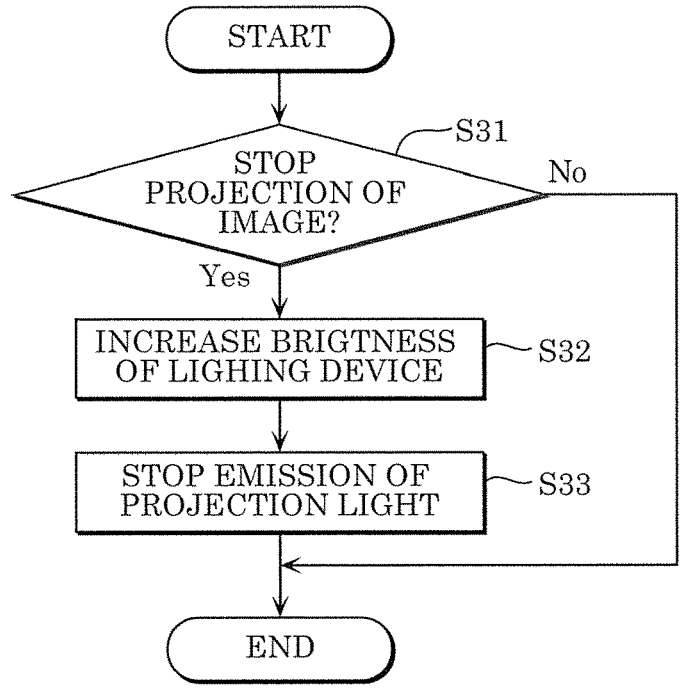
FIG. 12B is a flowchart illustrating an operation when the projector stops the projection of the projection light.

The operation when projector 11 stops the emission of projection light 1 will now be described with reference to FIG. 12B. FIG. 12B is a flowchart illustrating the operation to stop the emission of projection light 1 by projector 11. In other words, FIG. 12B is a flowchart illustrating the operation to stop the display of an image on display panel 30b.

As illustrated in FIG. 10B, when an image is displayed on display panel 30b, controller 12 determines whether to stop the projection of the image on display panel 30b or not (S31). For example, when the data stored in the storage medium is reproduced by a Blu-ray player to display an image on display panel 30b, based on the audio signal stored with the image data, controller 12 may determine to stop the projection of the image onto display panel 30b. Specifically, the audio signal is not input into controller 12 during a period in which the Blu-ray player outputs the non-display data to projector 11. For this reason, using a non-input state of the audio signal as a trigger, for example, controller 12 determines to stop the projection of the image onto display panel 30b. Thereby, the image data output from Blu-ray player to projector 11 is switched from the display data to the non-display data, and at this time, controller 12 stops the projection of the image onto display panel 30b. In other words, the image corresponding to the non-display data is no longer displayed on display panel 30b.

Controller 12 can use any method in determination whether to stop the projection of the image onto display panel 30b or not. For example, projection system 200 includes a human sensor. When the human sensor no longer senses a person on the street near the store window, controller 12 may determine to stop the projection of the image onto display panel 30b. For example, controller 12 may determine to stop the projection of the image after a predetermined time has passed since the human sensor no longer sensed a person. Alternatively, controller 12 may include a timer, and may determine to stop the projection of the image after a predetermined time has passed from the start of the projection of the image onto display panel 30b. Alternatively, a user may determine whether to stop the projection of the image onto display panel 30b or not. In other words, based on the input from the user, controller 12 may determine to stop the projection of the image onto display panel 30b.

When controller 12 determines to stop the projection of the image onto display panel 30b (Yes in S31), controller 12 performs the control to increase (enhance) the quantity of light of lighting device 50 (S32). In other words, the brightness of lighting device 50 is increased compared to the case where the image is projected. Specifically, controller 12 performs the control to restore the quantity of light of lighting device 50 to the level before the start of the projection of the image onto display panel 30b.

Controller 12 then stops the emission of projection light 1 by projector 11 (S33). Specifically, controller 12 applies the voltage to diffusion film 7 of display panel 30b to convert diffusion film 7 into the transparent state, and stop the emission of projection light 1 by projector 11. Thereby, the image is no longer displayed on display panel 30b, and therefore the viewer can view the display items from the street (outside of the shop). In the case where the image is displayed based on the audio signal, controller 12 controls such that an image is not projected onto display panel 30b during a period in which the audio signal is not input.

When controller 12 determines to project the image onto display panel 30b (No in S31), controller 12 continuously causes projector 11 to emit projection light 1, projecting the image onto display panel 30b.

[3-3. Advantageous Effects]

As described above, in transparent screen 30 according to one aspect of the present embodiment, display panel 30b further includes two pieces of glass 9 sandwiching diffusion film 7 and tinted film 6. The lateral surfaces of display panel 30b are covered with sealing material 70.

Such a configuration can prevent the invasion of the gas containing water vapor into tinted film 6 and diffusion film 7. Thus, display panel 30b can have improved reliability.

Moreover, projection system 200 according to one aspect of the present embodiment further includes lighting device 50. Controller 12 controls such that the quantity of light of lighting device 50 during a period in which projector 11 projects an image is smaller than the quantity of light of lighting device 50 during a period in which projector 11 does not project an image.

This operation can prevent a reduction by lighting device 50 in contrast of the image displayed on display panel 30b. Accordingly, projection system 200 can display high contrast images on display panel 30b.

Other Modifications

Embodiments 1 to 3 have been described above as exemplary techniques disclosed in the present application. However, these embodiments are not construed as limitations to the techniques according to the present disclosure, and embodiments appropriately modified, replaced, added, or eliminated are also applicable. The components described in Embodiments 1 to 3 can be combined into new embodiments.

Other embodiments will now be exemplified.

Figure 13:
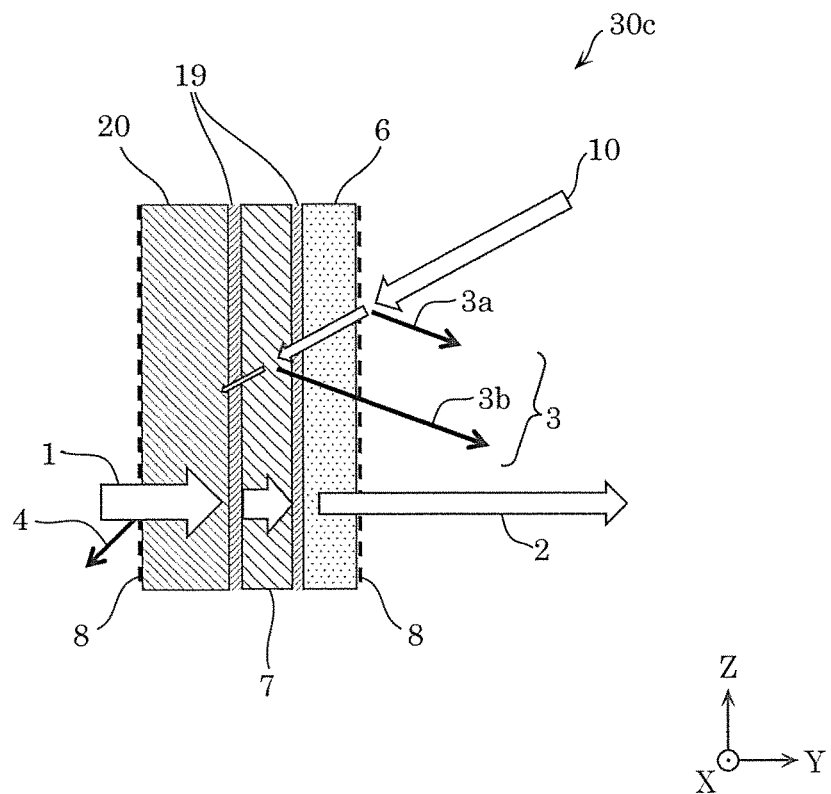
FIG. 13 is a diagram illustrating a configuration of a display panel according to a modification.

Although one example in which the display panel includes two pieces of glass 9 has been described in Embodiments 1 to 3, the display panel can have any other configuration. FIG. 13 is a sectional view illustrating a configuration of a modification of a display panel. As illustrated in FIG. 13, display panel 30c may include a single transparent glass or resin plate 20. In display panel 30c, transparent plate 20 is bonded to diffusion film 7 and tinted film 6 is bonded to diffusion film 7 with transparent adhesive layer 19.

In such a configuration, the number of glass plates to be used can be reduced by one glass plate, and thus the transmittance of the entire display panel 30c can be increased. In other words, the contrast can be increased because the luminance of transmitted image 2 is increased although the luminance of projection light 1 from projector 11 remains the same. Such a configuration can also reduce the thickness of display panel 30c. Thus, such a display panel can be used in places having restrictions on the thickness.

In the case of the configuration illustrated in FIG. 13, antireflective AR film 8 may be disposed on the surface of tinted film 6 which external light 10 enters.

Display panel 30c having such a configuration can extinguish reflected light 3a on the surface of tinted film 6 which external light 10 enters. While transparent plate 20 is disposed on the surface of display panel 30c which projection light 1 from projector 11 enters in FIG. 13, transparent plate 20 may be disposed on the surface of display panel 30c which external light 10 enters. In this case, antireflective AR film 8 may be disposed on the surface of diffusion film 7 which projection light 1 from projector 11 enters. Such a configuration attains action and effects similar to those of the configuration in which transparent plate 20 is disposed on the surface of display panel 30c which projection light 1 enters.

Although one example in which a single tinted film 6 is used has been described in Embodiments 1 to 3, the display panel can have any other configuration. The display panel may include several tinted films 6.

Such a configuration can control the display panel to have a lower transmittance.

Intermediate film 5 may be formed of an ultraviolet light absorptive material.

Such an intermediate film can reduce the degradation of diffusive liquid crystal molecule 44 and tinted liquid crystal molecule 45, which is caused by the irradiation with ultraviolet light.

Antireflective AR film 8 may be treated to have reflectance reduction properties and ultraviolet light blocking properties.

Such an Antireflective AR film can reduce the degradation of diffusive liquid crystal molecule 44 and tinted liquid crystal molecule 45, which is caused by the irradiation with ultraviolet light.

Glass 9 and transparent plate 20 may have a function as a touch screen.

Such a configuration improves the convenience of the transparent screen; for example, the image to be projected can be changed through the operation of the surfaces of display panels 30a to 30c.

Although controller 12 is connected to the components through tinted film control line 14, diffusion film control line 15, projector control line 16, and illuminance sensor control line 17 to perform a variety of operations for control, controller 12 may wirelessly perform these operations. Such a configuration circumvents the constraints to the installation caused by the control lines, increasing the freedom of the position where controller 12 is installed.

In the case where two or more illuminance sensors 13 are disposed, at least one illuminance sensor 13 is disposed at a position enabling the sensing of external light 10 which enters display panels 30a to 30c from a space where projector 11 is disposed. When projector 11 does not project an image, controller 12 may control the transmittance of the tinted film based on the illuminance sensed by the at least one illuminance sensor 13.

Such a configuration can reduce external light 10 emitted from the space where projector 11 is disposed to the space where viewer 18 is present, when projector 11 does not project an image.

Although two pieces of glass 9 are used in Embodiments 1 to 3, the two pieces of glass 9 may be eliminated. For example, glass 9 may be eliminated by imparting strength to the substrate having the surface of tinted film 6 which external light enters and the substrate having the surface of diffusion film 7 where projection light 1 from projector 11 enters.

Such a configuration can reduce the thickness of the display panel, and reduce the number of members and the number of production steps.

Although an example in which controller 12 changes the brightness of lighting device 50 according to whether the image is projected or not has been described in Embodiment 3, the brightness can be controlled by any other method. For example, when projector 11 does not emit projection light 1, controller 12 may change the brightness of lighting device 50 according to the illuminance sensed by illuminance sensor 13 (not illustrated).

Thereby, the brightness of illumination light emitted to the display items can be changed according to the illuminance of external light. Thus, the display items can have better appearances even when the illuminance of external light varies.

The embodiments have been described above as exemplary techniques according to the present disclosure. For this purpose, the accompanying drawings and the detailed description have been provided.

Accordingly, the components illustrated and described in the accompanying drawings and the detailed description include not only essential components to the solution of the problems but also components which are not essential to the solution of the problems and are illustrated to exemplify the techniques. For this reason, the illustration and description of those non-essential components in the accompanying drawings and the detailed description should not be recognized as that those non-essential components are essential.

The embodiments described above are only illustrations of the techniques according to the present disclosure, and a variety of modifications, replacement, additions, and eliminations can be made within the scope of the claims or the range of their equivalents.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The transparent screen, projection system, and method of controlling a transparent screen according to the present disclosure are generally applicable to projection systems which display images on sites made of glass. Specifically, the transparent screen, projection system, and method of controlling a transparent screen according to the present disclosure are applicable to partition glass, store windows, front and rear windows of automobiles, and vending machines.

What is claimed is:

1. A transparent screen for displaying an image projected from a projector, the transparent screen comprising:
   a display panel including:
      a diffusion film which diffuses projection light from the projector, and
      a tinted film which is disposed to be remoter from the projector than the diffusion film is and has a transmittance which is variable; and
   a controller which performs control to decrease the transmittance of the tinted film when an illuminance of a site where the transparent screen is installed is equal to or higher than a first threshold, and performs control to increase the transmittance of the tinted film when the illuminance is equal to or lower than a second threshold lower than the first threshold,
   wherein the diffusion film is bonded to the tinted film.

2. The transparent screen according to claim 1,
   wherein the controller performs control to decrease the transmittance of the tinted film and increase a luminance of an image projected by the projector when the illuminance is equal to or higher than the first threshold, and to increase the transmittance of the tinted film and decrease the luminance of the image projected by the projector when the illuminance is equal to or lower than the second threshold.

3. The transparent screen according to claim 2,
   wherein the controller performs the control to maintain the image on the display panel at a constant level of contrast.

4. The transparent screen according to claim 1, further comprising:
   an illuminance sensor,
   wherein the controller performs the control according to the illuminance sensed by the illuminance sensor.

5. The transparent screen according to claim 4,
   wherein the illuminance sensor is disposed on an outermost surface of the display panel.

6. The transparent screen according to claim 4,
   wherein the illuminance sensor is disposed at a position insusceptible to influences of the projection light from the projector.

7. The transparent screen according to claim 1,
   wherein the controller does not control the transmittance of the tinted film when the projector does not project the image.

8. The transparent screen according to claim 1,
   wherein the diffusion film is convertible between a diffusion state and a non-diffusion state.

9. The transparent screen according to claim 1,
   wherein the display panel further includes two pieces of glass which sandwich the diffusion film and the tinted film, and
   the display panel has lateral surfaces covered with a sealing material.

10. A projection system, comprising:
    a projector; and
    the transparent screen according to claim 1 which displays an image projected from the projector.

11. The projection system according to claim 10, further comprising a lighting device,
    wherein the controller performs control to yield a quantity of light of the lighting device during a period in which the projector projects an image, the quantity being smaller than a quantity of light of the lighting device during a period in which the projector does not project the image.

12. A method of controlling a transparent screen which displays an image projected from a projector, the transparent screen including:
- a diffusion film which diffuses projection light from the projector; and
- a tinted film which is disposed to be remoter from the projector than the diffusion film is and has a transmittance which is variable, the method comprising:

performing control to decrease the transmittance of the tinted film when an illuminance of a site where the tinted film is located is equal to or higher than a first threshold, and to increase the transmittance of the tinted film when the illuminance is equal to or lower than a second threshold lower than the first threshold.

* * * * *